US012700203B2

(12) United States Patent
Hirai

(10) Patent No.: US 12,700,203 B2
(45) Date of Patent: Aug. 4, 2026

(54) INFORMATION PROCESSING APPARATUS, INFORMATION PROCESSING METHOD, AND RECORDING MEDIUM

(71) Applicant: Panasonic Automotive Systems Co., Ltd., Kanagawa (JP)

(72) Inventor: Atsushi Hirai, Tokyo To (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 255 days.

(21) Appl. No.: 18/607,910

(22) Filed: Mar. 18, 2024

(65) Prior Publication Data

US 2024/0331325 A1 Oct. 3, 2024

(30) Foreign Application Priority Data

Mar. 27, 2023 (JP) ................................. 2023-049271

(51) Int. Cl.
| | |
|---|---|
| *G06T 19/00* | (2011.01) |
| *G06T 19/20* | (2011.01) |
| *G06V 40/20* | (2022.01) |

(52) U.S. Cl.
CPC .............. *G06T 19/20* (2013.01); *G06V 40/28* (2022.01); *G06T 2219/2004* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 9,329,691 B2 * | 5/2016 | Izumi | ...................... | G06F 3/011 |
| 2010/0156787 A1 * | 6/2010 | Katayama | ............ | G02B 27/017 |
| | | | | 345/157 |
| 2011/0080337 A1 * | 4/2011 | Matsubara | .............. | G06F 3/017 |
| | | | | 345/156 |

(Continued)

FOREIGN PATENT DOCUMENTS

| | | |
|---|---|---|
| JP | 2009-251702 A | 10/2009 |
| JP | 2011-081506 A | 4/2011 |

(Continued)

OTHER PUBLICATIONS

Japanese Office Action dated May 19, 2026 issued in Japanese patent application No. 2023-049271 along with an English translation.

*Primary Examiner* — Martin Mushambo
(74) *Attorney, Agent, or Firm* — Greenblum & Bernstein, P.L.C.

(57) ABSTRACT

An information processing apparatus includes a processor connected to a memory. The processor receives, from a camera, an image obtained by imaging a user being an operator. The processor sets, within an imaging range of the camera, a virtual operation region for receiving an operation onto a device. The processor detects a hand of the user on the basis of the image. The processor operates the device in accordance with a moving direction of the hand of the user in a case where the hand of the user has been detected from the virtual operation region. The processor changes a position of the virtual operation region to follow a position of the hand of the user in a case where the position of the hand of the user has moved from an inside of the virtual operation region to an outside of the virtual operation region.

11 Claims, 15 Drawing Sheets

(56)                References Cited

U.S. PATENT DOCUMENTS

| | | | | |
|---|---|---|---|---|
| 2012/0032905 A1* | 2/2012 | Koshiyama | ............ | G06F 3/043 |
| | | | | 345/173 |
| 2012/0119988 A1* | 5/2012 | Izumi | .................. | G06F 3/0304 |
| | | | | 382/103 |
| 2013/0114100 A1* | 5/2013 | Torii | .................. | H04N 1/00037 |
| | | | | 358/1.14 |
| 2014/0189523 A1* | 7/2014 | Shuttleworth | ........ | G06F 3/0484 |
| | | | | 715/741 |
| 2015/0054784 A1* | 2/2015 | Kim | ................... | G06F 3/04883 |
| | | | | 345/174 |
| 2015/0186708 A1* | 7/2015 | Katz | ................... | G06V 20/653 |
| | | | | 382/115 |
| 2015/0205550 A1* | 7/2015 | Lee | ....................... | G06F 3/1292 |
| | | | | 358/1.15 |
| 2016/0232675 A1 | 8/2016 | Ogasawara et al. | | |
| 2017/0017442 A1* | 1/2017 | Ishii | ...................... | G06F 3/1285 |
| 2017/0131964 A1* | 5/2017 | Baek | .................. | G06F 3/1423 |
| 2019/0155397 A1* | 5/2019 | Liu | .......................... | G06F 3/048 |
| 2019/0163342 A1* | 5/2019 | Nagano | ..................... | G06F 3/01 |
| 2019/0251750 A1* | 8/2019 | Brewer | ................ | G06F 3/0304 |
| 2019/0260886 A1* | 8/2019 | Matsumoto | ........ | H04N 1/00411 |
| 2019/0391710 A1* | 12/2019 | Shen | ................... | G06F 3/04883 |

| | | | | |
|---|---|---|---|---|
| 2020/0159319 A1* | 5/2020 | Lin | ........................ | G06F 3/017 |
| 2022/0044793 A1* | 2/2022 | Jimenez | ................. | G16H 40/67 |
| 2022/0137713 A1 | 5/2022 | Hu et al. | | |
| 2022/0197395 A1* | 6/2022 | Miyano | .................. | G06F 3/011 |
| 2022/0197396 A1* | 6/2022 | Sugiyama | ............... | G06F 3/011 |
| 2022/0197498 A1* | 6/2022 | Awazu | ................... | G06F 3/017 |
| 2022/0253147 A1* | 8/2022 | Miyano | .............. | G06F 3/04842 |
| 2023/0013539 A1* | 1/2023 | Holland | .................. | G06T 7/73 |
| 2023/0109046 A1* | 4/2023 | Urakawa | .............. | G06F 3/1236 |
| 2023/0168744 A1 | 6/2023 | Kobayashi et al. | | |
| 2023/0176657 A1* | 6/2023 | Chang | .................... | G06T 11/00 |
| | | | | 715/773 |
| 2023/0333724 A1* | 10/2023 | Salowitz | ............ | G06F 3/04845 |
| 2023/0377223 A1* | 11/2023 | Moll | ....................... | G06F 3/017 |
| 2024/0080194 A1* | 3/2024 | Akkapeddi | .......... | H04L 63/107 |
| 2024/0404313 A1* | 12/2024 | Go | .......................... | G06T 19/00 |

FOREIGN PATENT DOCUMENTS

| | | |
|---|---|---|
| JP | 2016-148901 A | 8/2016 |
| JP | 2017-027218 | 2/2017 |
| JP | 2019-144763 | 8/2019 |
| JP | 2021-177313 A | 11/2021 |
| JP | 2022-522491 A | 4/2022 |
| WO | 2018/083737 A | 5/2018 |

* cited by examiner

INFORMATION PROCESSING APPARATUS, INFORMATION PROCESSING METHOD, AND RECORDING MEDIUM

CROSS-REFERENCE TO RELATED APPLICATIONS

This application is based upon and claims the benefit of priority from Japanese Patent Application No. 2023-049271, filed on Mar. 27, 2023, the entire contents of which are incorporated herein by reference.

FIELD

Embodiments described herein relate generally to an information processing apparatus, an information processing method, and a recording medium.

BACKGROUND

As known techniques, there are various devices that detect a motion of a hand of a user and perform motion control in accordance with the detected motion of the hand (for example, a patent literature JP 2019-144763 A). In one example, regarding an operation target such as an operation device, there is a device that changes a display image on the operation device in accordance with a motion of the user's hand without directly touching the operation device by the user.

SUMMARY

An information processing apparatus according to one aspect of the present disclosure includes a memory in which a computer program is stored and a hardware processor connected to the memory. The hardware processor is configured to perform processing by executing the computer program. The processing includes receiving, from a camera, an image obtained by imaging a user being an operator. The processing includes setting, within an imaging range of the camera, a virtual operation region for receiving an operation onto a device. The processing includes detecting a hand of the user on the basis of the image. The processing includes operating the device in accordance with a moving direction of the hand of the user in a case where the hand of the user has been detected from the virtual operation region. The processing includes changing a position of the virtual operation region to follow a position of the hand of the user in a case where the position of the hand of the user has moved from an inside of the virtual operation region to an outside of the virtual operation region.

DETAILED DESCRIPTION

Hereinafter, an embodiment of the information processing apparatus according to the present disclosure will be described with reference to the drawings.

Findings of the Inventors

Regarding an operation target such as an operation device, there is a device that changes a display image on the operation device in accordance with a motion of the user's hand with no direct touching by the user on the operation device. In the above technique, in order to specify user's selection operation or the like, it is conceivable to set a region where the motion of the hand is detectable. Hereinafter, the region where the motion of the hand is detectable is also referred to as a virtual operation region. Regarding such a virtual operation region, by setting the virtual operation region with a predetermined size in a space on the front side of the operation device, the user can operate the operation device only in the virtual operation region, and cannot operate the operation device outside such an operable region. Therefore, it is desirable to set the virtual operation region so as to facilitate operation of the user.

First Embodiment

Before describing an information processing apparatus according to a first embodiment, an apparatus that operates on the basis of the motion of the user's hand will be described.

Figure 1:
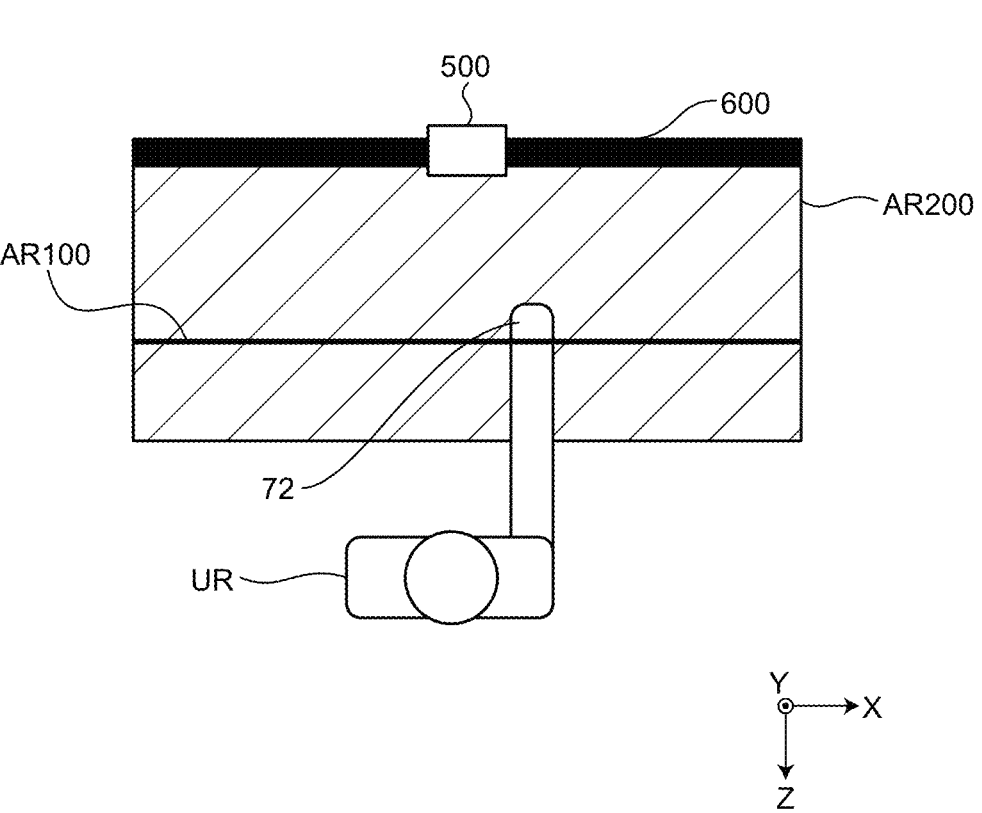
FIG. 1 is a schematic diagram illustrating an example of an information processing apparatus.

FIG. 1 illustrates an example of an information processing apparatus that operates on the basis of a motion of the user's hand. The information processing apparatus includes a sensor 500 and an operation device 600. An example of the sensor 500 is a camera. The sensor 500 captures an image of a user UR being an operator. The user UR has arms. The arm includes not only an upper arm and a forearm but also a hand. The hand also includes a fingertip 72. An example of the operation device 600 is a display apparatus. The information processing apparatus controls data displayed by the operation device 600 on the basis of the position of the fingertip 72 of the user UR.

In addition, the information processing apparatus has a virtual operation region AR 100 set for receiving an operation on a device (for example, the operation device 600) and has a detection enabled region AR 200 set as a region in which the motion of the fingertip 72 of the user UR is detectable. The detection enabled region AR 200 is set within a sensing range of the sensor 500, for example, set in front of a display surface of the operation device 600. In a case where the sensor 500 is a camera, the sensing range may be referred to as an imaging range. The virtual operation region AR 100 is included in the detection enabled region AR 200 and is set as a plane parallel to the display surface of the operation device 600, for example, as illustrated in FIG. 1.

In the configuration of FIG. 1, when the fingertip 72 enters a range that is closer to the operation device 600 more than the virtual operation region AR 100, the information processing apparatus determines that an operation instruction for the operation device 600 has been made, executes processing based on the operation instruction, and displays a result of the execution, on the operation device 600.

In FIG. 1 and the drawings related to the operation device 600 described below, an X axis, a Y axis, and a Z axis orthogonal to each other respectively represent a left-right direction, an up-down direction, and a front-rear direction of the operation device 600. In the following description, when simply described as the X direction, the Y direction, or the Z direction, they represent their axial directions and each includes two opposite directions.

In addition, when the direction is specified as the positive direction on the X axis, the direction is one direction from the left side to the right side, when the direction is specified as the positive direction on the Y axis, the direction is one direction from the lower side to the upper side, and when the direction is specified as the positive direction on the Z axis, the direction is one direction from the front side to the rear side. In addition, when the direction is specified as the negative direction on the X axis, the direction is one direction from the right side to the left side, when the direction is specified as the negative direction on the Y axis, the direction is one direction from the upper side to the lower side, and when the direction is specified as the negative direction on the Z axis, the direction is one direction from the rear side to the front side.

Figure 2:
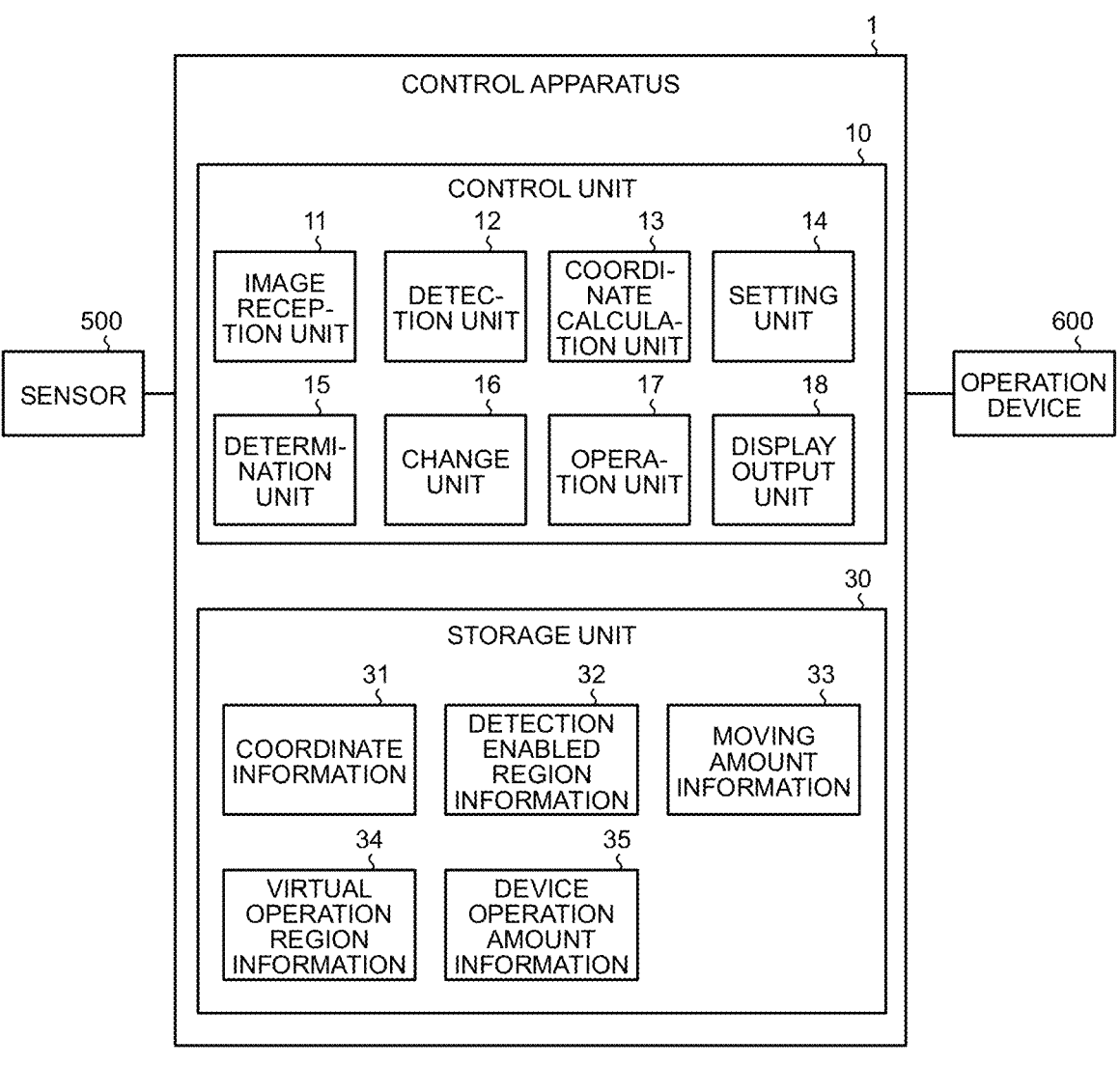
FIG. 2 is a block diagram illustrating an example of a functional configuration of an information processing apparatus according to a first embodiment.

FIG. 2 is a diagram illustrating a schematic configuration of an information processing system including a control apparatus 1 that is the information processing apparatus according to the first embodiment. The information processing apparatus according to the first embodiment includes the sensor 500, the operation device 600, and the control apparatus 1.

In one example, the sensor 500 is a camera. An example of the sensor 500 includes a visible light camera. The sensor 500 outputs a captured image of the user UR to the control apparatus 1. The sensor 500 is an example of an imaging unit. The sensor 500 continuously executes imaging processing and outputs the captured image to the control apparatus 1. The operation device 600 is a display that displays various types of data. The operation device 600 is an example of a device. In one example, the operation device

600 is a display device such as a liquid crystal display. It is assumed that the number of the operation device 600 is one.

The control apparatus 1 executes processing of data displayed on the operation device 600 in accordance with the motion of the fingertip 72 of the user UR detected through the sensor 500.

The control apparatus 1 includes a control unit 10 and a storage unit 30. The control unit 10 is configured as a central processing unit (CPU), for example, and integrally controls operation of each unit of the control apparatus 1. The control apparatus 1 according to the present embodiment includes ROM and RAM (not illustrated). The ROM stores various programs. The RAM is a work area used when the CPU executes a program.

The CPU executes the program stored in the ROM by using the RAM as a work area, thereby implementing an image reception unit 11, a detection unit 12, a coordinate calculation unit 13, a setting unit 14, a determination unit 15, a change unit 16, an operation unit 17, and a display output unit 18 as illustrated in FIG. 2. This may be paraphrased as that the control apparatus 1 includes the image reception unit 11, the detection unit 12, the coordinate calculation unit 13, the setting unit 14, the determination unit 15, the change unit 16, the operation unit 17, and the display output unit 18. It is allowable to use mutually different hardware devices to implement the image reception unit 11, the detection unit 12, the coordinate calculation unit 13, the setting unit 14, the determination unit 15, the change unit 16, the operation unit 17, and the display output unit 18.

The storage unit 30 stores various types of information. The storage unit 30 is implemented by hardware for storing information (in other words, data), such as memory or storage. Specifically, the storage unit 30 stores coordinate information 31, detection enabled region information 32, moving amount information 33, virtual operation region information 34, and device operation amount information 35.

The coordinate information 31 includes three-dimensional coordinates of an installation position of the sensor 500, information of an attachment angle of the sensor 500, and three-dimensional coordinates of the position of the operation device 600. The detection enabled region information 32 is coordinate information related to the setting of the detection enabled region. The detection enabled region corresponds to the detection enabled region AR 200 described above, and is a region in which the position and motion of the fingertip 72 of the user UR are detectable. The detection enabled region includes information for defining a minimum detection enabled position and a maximum detection enabled position to be described below.

The moving amount information 33 is information indicating the moving amount of the fingertip 72 of the user UR. The virtual operation region information 34 is coordinate information related to the setting of the virtual operation region. The virtual operation region corresponds to the virtual operation region AR 100 described above, and is a region for receiving an operation by the fingertip 72 of the user UR. The virtual operation region includes information for defining a minimum operation position indicating one end in a direction in which an operation to be described below is performed and a maximum operation position indicating the other end in the direction.

The device operation amount information 35 is information indicating the operation of the operation device 600 corresponding to the moving amount of the fingertip 72 of the user UR. An example of the operation of the operation device 600 is a slide operation with the operation device 600. Hereinafter, the slide operation is also referred to as a swipe operation. For example, when the operation device 600 is a display device, the device operation amount information 35 is information including a moving amount corresponding to a seek operation performed by the fingertip 72 that has detected a moving image displayed on the display device.

The coordinate system in the coordinate information 31, the detection enabled region information 32, the moving amount information 33, the virtual operation region information 34, and the device operation amount information 35 is absolute coordinates. Note that the coordinate system is not limited to absolute coordinates. For example, the coordinate system may be relative coordinates based on the operation device 600. In other words, the coordinate system may be relative coordinates based on the positional relationship between the user UR and the operation device 600.

The image reception unit 11 receives, from the sensor 500, an image obtained by imaging the user UR being an operator. The detection unit 12 detects the hand of the user UR on the basis of the image that has captured the user UR. For example, the detection unit 12 detects a swipe operation of moving the hand of the user UR in one direction.

The coordinate calculation unit 13 calculates three-dimensional coordinates of the fingertip 72 of the user UR. Within the imaging range of the sensor 500, the setting unit 14 sets a virtual operation region that receives an operation onto the operation device 600.

The determination unit 15 determines whether the three-dimensional coordinates calculated by the coordinate calculation unit 13 are included in the virtual operation region. In addition, the determination unit 15 determines whether the seek operation of the user UR is continued. Moreover, when the three-dimensional coordinates fall outside the virtual operation region, the determination unit 15 determines whether the three-dimensional coordinates are beyond the maximum operation position.

When the position of the hand of the user UR has moved from the inside of the virtual operation region to the outside of the virtual operation region, the change unit 16 changes the position of the virtual operation region so as to follow the position of the hand. For example, when the hand of the user UR has moved from the inside of the virtual operation region to the outside of the virtual operation region due to the swipe operation, the change unit 16 changes the position of the virtual operation region so as to follow the position of the hand. In addition, for example, the change unit 16 changes the minimum operation position or the maximum operation position, each corresponding to the moving direction of the hand of the user UR, so as to follow the position of the hand of the user while keeping the size of the virtual operation region.

Moreover, for example, the change unit 16 changes the setting position of the virtual operation region in accordance with the position of the hand detected in the swipe operation, or the seek operation corresponding to the swipe operation. For example, the change unit 16 changes the maximum operation position in the virtual operation region so as to follow the position of the fingertip 72 that performs the seek operation. In addition, for example, the change unit 16 changes the minimum operation position in the virtual operation region so as to follow the position of the fingertip 72 that performs the seek operation.

When the hand of the user UR is detected from the virtual operation region, the operation unit 17 operates the operation device 600 according to the moving direction of the hand. Specifically, the operation unit 17 associates the positional relationship between the moving amount information 33 indicating the moving amount of the fingertip 72 of the user UR and the virtual operation region information 34, and operates the operation device 600 by making reference to the device operation amount information 35 with respect to the associated result.

For example, when the seek operation has been performed by the user UR, the operation unit 17 associates the positional relationship between the moving amount in the seek operation and the position of the fingertip 72 in the virtual operation region. Then, the operation unit 17 operates the operation device 600 by making reference to the device operation amount information 35 with respect to the associated result. The display output unit 18 controls the operation device 600 to display a result of executing the processing.

Figure 3:
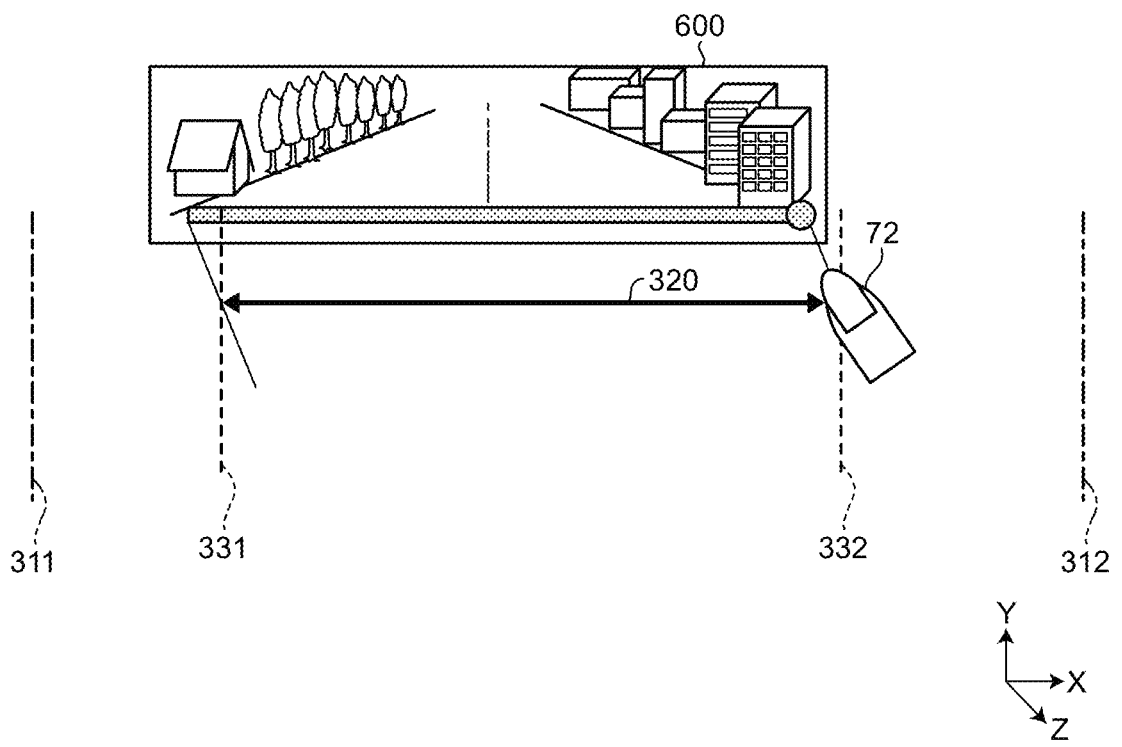
FIG. 3 is a diagram illustrating an example of a virtual operation region according to the first embodiment.
Figure 4:
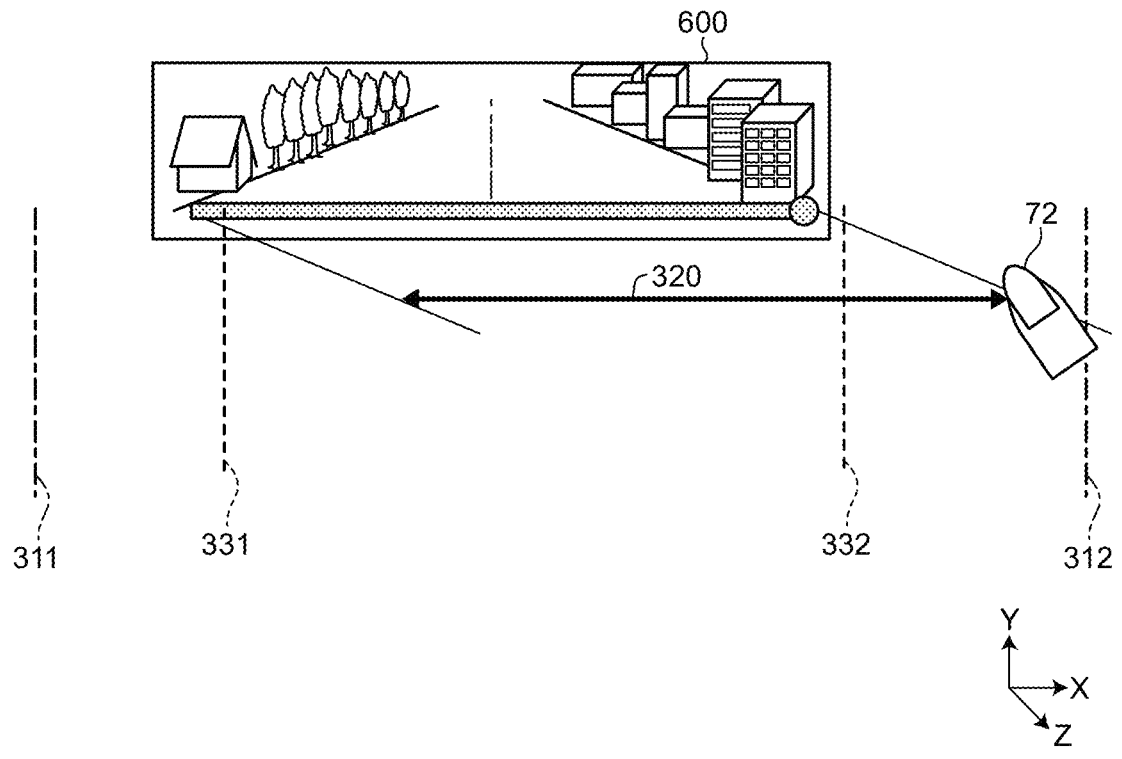
FIG. 4 is a diagram illustrating an example of the virtual operation region according to the first embodiment.
Figure 5:
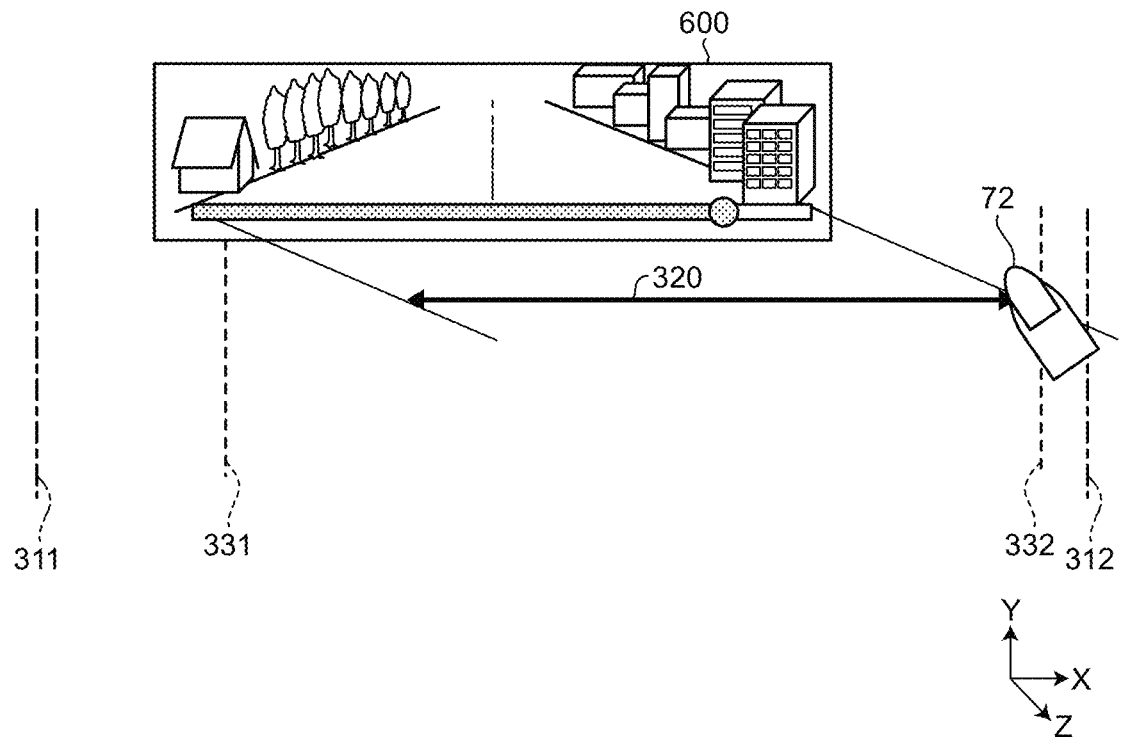
FIG. 5 is a diagram illustrating an example of the virtual operation region according to the first embodiment.

An example of performing operation of changing the virtual operation region by the change unit 16 will be described with reference to FIGS. 3 to 5. FIGS. 3 to 5 are diagrams illustrating the operation of changing the virtual operation region. FIGS. 3 to 5 assume a case of performing an operation on a video displayed on a display surface of the operation device 600. Here, an example in which a video is displayed on the display surface of the operation device 600 will be described, but an image may be displayed on the display surface of the operation device 600.

A minimum detection enabled position 311 is a position corresponding to one end of the detection enabled region in the horizontal direction. In the example illustrated in FIG. 3, the minimum detection enabled position 311 is a position corresponding to the left end of the detection enabled region in the horizontal direction. A maximum detection enabled position 312 is a position corresponding to the other end of the detection enabled region in the horizontal direction. In the example illustrated in FIG. 3, the maximum detection enabled position 312 is a position corresponding to the right end of the detection enabled region in the horizontal direction.

A minimum operation position 331 is a position corresponding to one end of the virtual operation region in the horizontal direction. In the example illustrated in FIG. 3, the minimum operation position 331 is a position corresponding to the left end of the virtual operation region in the horizontal direction. A maximum operation position 332 is a position corresponding to the other end of the virtual operation region in the horizontal direction. In the example illustrated in FIG. 3, the maximum operation position 332 is a position corresponding to the right end of the virtual operation region in the horizontal direction.

Note that the minimum operation position 331 and the maximum operation position 332 illustrated in FIG. 3 are assumed to be the minimum operation position 331 and the maximum operation position 332 in the virtual operation region in the initial state.

In FIG. 3, for example, it is assumed that a swipe operation is performed from the left side to the right side by the fingertip 72 in order to advance the video displayed on the display surface. In the example illustrated in FIG. 3, the swipe operation corresponds to a seek operation on the video. When a position 320 of the fingertip 72 of the user UR moves to the right side of the maximum operation position 332 (refer to FIG. 4), the determination unit 15 determines that the fingertip 72 has exceeded the maximum operation position with the seek operation continued.

In this case, the change unit 16 changes the setting position of the virtual operation region to follow the motion of the fingertip 72. Specifically, when the fingertip 72 moves to be positioned on the right side of the maximum operation position 332 in the virtual operation region, the change unit 16 changes the setting position of the virtual operation region by moving the maximum operation position 332 to follow the position of the fingertip 72.

FIG. 5 is a diagram illustrating a state after changing the setting position of the virtual operation region. As illustrated in FIG. 5, the change unit 16 changes the setting position of the virtual operation region to follow the fingertip 72 while keeping the size of the virtual operation region. By changing the virtual operation region, the user UR can operate the operation device 600. For example, the user UR can perform a seek operation on the operation device 600.

Incidentally, in a case where the fingertip 72 has moved to the left side of the minimum operation position 331 in the virtual operation region, the change unit 16 changes the setting position of the virtual operation region by moving the minimum operation position 331 to follow the position of the fingertip 72. When a continuous operation in one direction such as a seek operation is performed, the change unit 16 moves the virtual operation region to follow the position of the fingertip 72.

Figure 6:
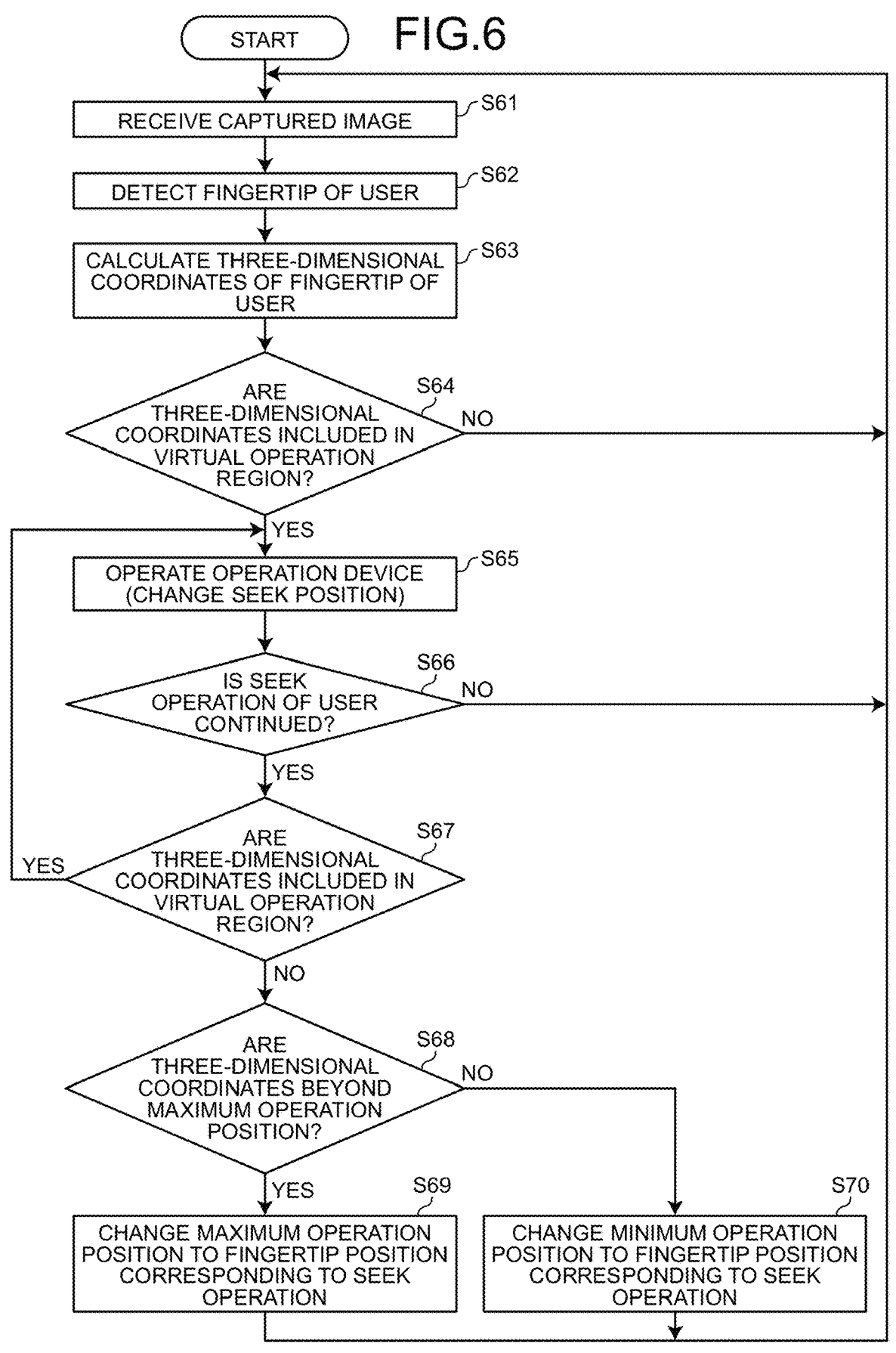
FIG. 6 is a flowchart illustrating a processing procedure of a control apparatus 1 according to the first embodiment.

Next, a processing procedure of the control apparatus 1 according to the first embodiment will be described with reference to FIG. 6. FIG. 6 is a flowchart illustrating a processing procedure of the control apparatus 1 according to the first embodiment. Note that the control apparatus 1 is supposed to have set the virtual operation region in advance, and the present processing will be described as a flow of control processing related to seek operation.

First, the image reception unit 11 receives, from the sensor 500, an image obtained by imaging the user UR (step S61). Subsequently, the detection unit 12 detects the fingertip 72 of the user UR on the basis of the image received by the image reception unit 11 (step S62). Subsequently, the coordinate calculation unit 13 calculates three-dimensional coordinates of the fingertip 72 of the user UR (step S63).

Subsequently, the determination unit 15 determines whether the three-dimensional coordinates calculated by the coordinate calculation unit 13 are included in the virtual operation region (step S64). When the determination unit 15 makes a determination that the three-dimensional coordinates fall outside the virtual operation region (step S64: No), the processing of the control apparatus 1 proceeds to step S61. In contrast, when the determination unit 15 makes a determination that the three-dimensional coordinates are included in the virtual operation region (step S64: Yes), the processing of the control apparatus 1 proceeds to step S65.

In step S65, the operation unit 17 receives the operation of the operation device 600 on the basis of the positional relationship between the fingertip 72 of the user UR and the virtual operation region (step S65). In the present processing, the operation unit 17 is assumed to have received a seek operation of changing the seek position.

Subsequently, the determination unit 15 determines whether the seek operation of the user UR is continued (step S66). When the determination unit 15 makes a determination that the seek operation is not continued (step S66: No), the processing of the control apparatus 1 proceeds to step S61. In contrast, when the determination unit 15 makes a determination that the seek operation is continued (step S66: Yes), the process of the control apparatus 1 proceeds to step S67.

In step S67, the determination unit 15 determines whether the position of the three-dimensional coordinates transformed by the coordinate calculation unit 13, namely, the position of the fingertip 72 that performs the seek operation, is included in the virtual operation region (step S67). When the determination unit 15 makes a determination that the three-dimensional coordinates are included in the virtual operation region (step S67: Yes), the processing of the control apparatus 1 proceeds to step S65. In contrast, when the determination unit 15 makes a determination that the three-dimensional coordinates fall outside the virtual operation region (step S67: No), the processing of the control apparatus 1 proceeds to step S68.

In step S68, the determination unit 15 determines whether the three-dimensional coordinates are beyond the maximum operation position (step S68). When the determination unit 15 makes a determination that the three-dimensional coordinates are beyond the maximum operation position (step S68: Yes), the processing of the control apparatus 1 proceeds to step S69. In contrast, when the determination unit 15 makes a determination that the three-dimensional coordinates are less than (namely, are not beyond) the maximum operation position (step S68: No), the processing of the control apparatus 1 proceeds to step S70.

In step S69, the change unit 16 changes the maximum operation position in the virtual operation region to the position of the fingertip 72 corresponding to the seek operation (step S69). In step S70, the change unit 16 changes the minimum operation position in the virtual operation region to the position of the fingertip 72 corresponding to the seek operation (step S70). When the end of the processing of step S69 or step S70, the processing proceeds to step S61, and the processing continues while the control apparatus 1 is in execution.

As described above, the control apparatus 1 according to one aspect of the present disclosure detects a hand of the user UR on the basis of an image obtained by imaging the user UR being an operator. In addition, the control apparatus 1 sets, within the imaging range of the sensor 500, the virtual operation region for receiving an operation onto the operation device 600. In a case where the hand of the user UR has been detected from the virtual operation region, the control apparatus 1 operates the operation device 600 in accordance with the moving direction of the hand. In a case where the position of the hand of the user UR has moved from the inside of the virtual operation region to the outside of the virtual operation region, the control apparatus 1 changes the position of the virtual operation region to follow the position of the hand.

With this configuration, even when, for example, the fingertip 72 of the user UR has moved from the inside of the virtual operation region to the outside of the virtual operation region, the user UR can perform a continuous operation without returning to the initial virtual operation region by changing the position of the virtual operation region to follow the fingertip 72 by the control apparatus 1. Moreover, in the case of the seek operation, even when it is desired to return from the last frame of the moving image, continuous operations can be performed without returning to the initial virtual operation region.

The above-described embodiment can be implemented with appropriate modifications by changing part of the configuration or function of each apparatus described above. Therefore, in the following, some modifications according to the above-described embodiment will be described as other embodiments. In the following description, points different from the above-described embodiment will be mainly described, and detailed description of points common to the above description will be omitted.

The above-described embodiment uses a mode in which the number of operation devices 600 is one. A first modification will describe a mode that there are more operation devices 600.

First Modification

When plural operation devices 600 are provided, it is necessary to detect the fingertip 72 of the user UR on each operation device 600. However, the seek operation is a continuous operation, so that it is necessary to detect a state of the fingertip 72 of the user UR. Accordingly, in the seek operation, the control apparatus 1 according to the first modification changes the virtual operation region by prioritizing the operation of one of devices that is initially operated by the user UR.

Figure 7:
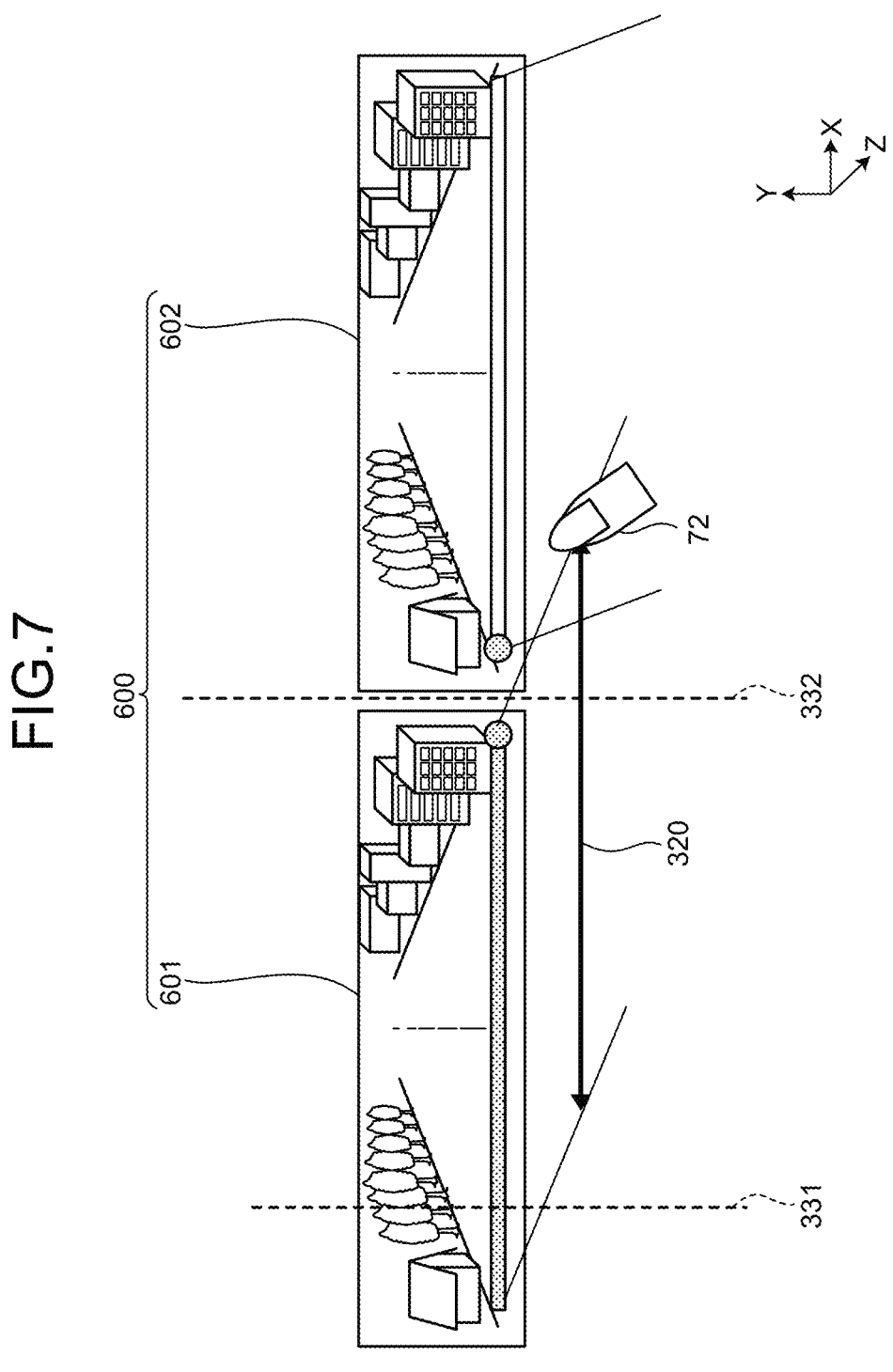
FIG. 7 is a diagram illustrating an example of a virtual operation region according to a first modification.

An operation example in which the change unit 16 according to the first modification changes the virtual operation region will be described with reference to FIG. 7. FIG. 7 is a diagram illustrating an operation of changing the virtual operation region.

In FIG. 7, plural operation devices 600, the position 320 of the fingertip 72 of the user UR, the minimum operation position 331 included in the virtual operation region of an operation device 601, and the maximum operation position 332 are illustrated. In the example of FIG. 7, the operation devices 600 include the operation device 601 and an operation device 602. The operation device 601 and the operation device 602 are in a state of being adjacent to each other. In FIG. 7, the fingertip 72 is performing a seek operation on the operation device 601.

In FIG. 7, it is assumed that a swipe operation is performed from the left side to the right side by the fingertip 72 in order to advance the video displayed on the display surface. The swipe operation corresponds to a video seek operation. The fingertip 72 exists outside the virtual operation region of the operation device 601, and exists in a virtual operation region of an operation device 602 adjacent to the operation device 601. Specifically, the fingertip 72 exists on the right side of the maximum operation position 332. In FIG. 7, the user UR performs a seek operation regarding the operation device 601. That is, although the fingertip 72 exists in the virtual operation region of the operation device 602, the user UR is not in a state of performing a seek operation regarding the operation device 602.

Therefore, when the position 320 of the fingertip 72 of the user UR moves to the right side of the maximum operation position 332 (refer to FIG. 7), the determination unit 15 determines that the maximum operation position has been exceeded in a state where the seek operation is continued. Subsequently, in the seek operation, the change unit 16 changes the virtual operation region by prioritizing the operation of the operation device 601 that is initially operated by the user UR out of the operation devices 600.

Specifically, when the determination unit 15 determines that the seek operation is continued and the position of the fingertip 72 corresponding to the seek operation is outside the virtual operation region of the operation device 601 initially operated, the change unit 16 changes the virtual operation region by prioritizing the operation of the operation device 601 operated first by the user UR.

With this configuration, even when there is the operation devices 600, for example, the control apparatus 1 can continuously perform operation regarding the operation device 600 that has been operated first.

Second Modification

The above-described embodiment has described the seek operation with the operation device 600. However, the operation is not limited to the seek operation. Therefore, in a second modification, an operation of changing the virtual operation region in luminance adjustment operation on the display surface of the operation device 600 will be described with reference to FIGS. 8, 9, and 10.

Figure 8:
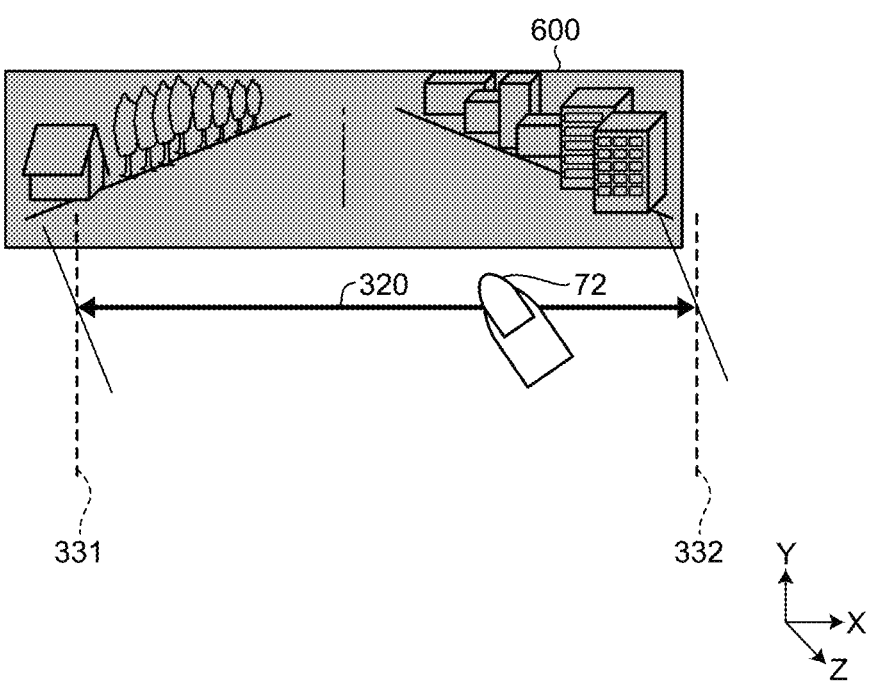
FIG. 8 is a diagram illustrating an example of a virtual operation region according to a second modification.
Figure 9:
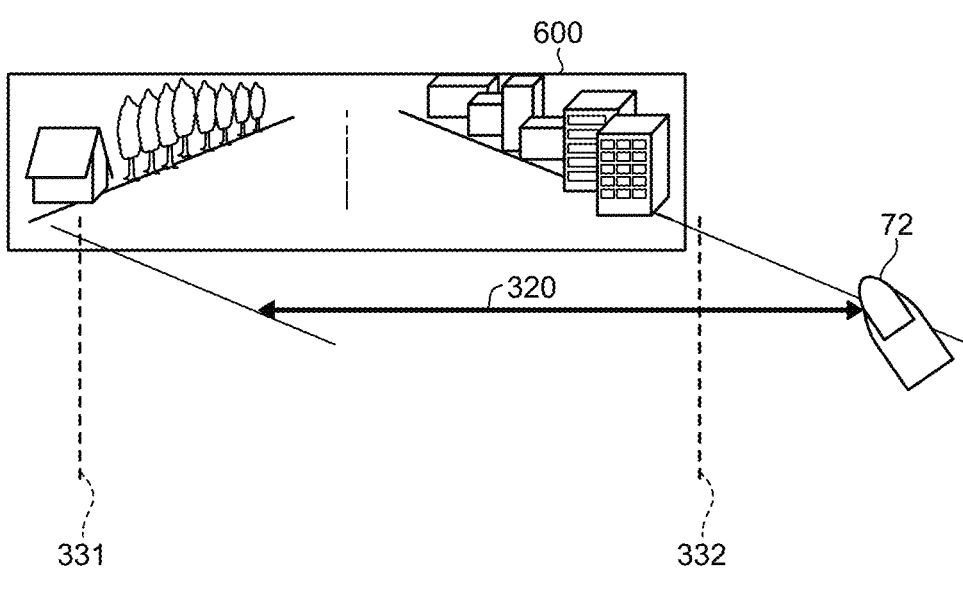
FIG. 9 is a diagram illustrating an example of the virtual operation region according to the second modification.
Figure 10:
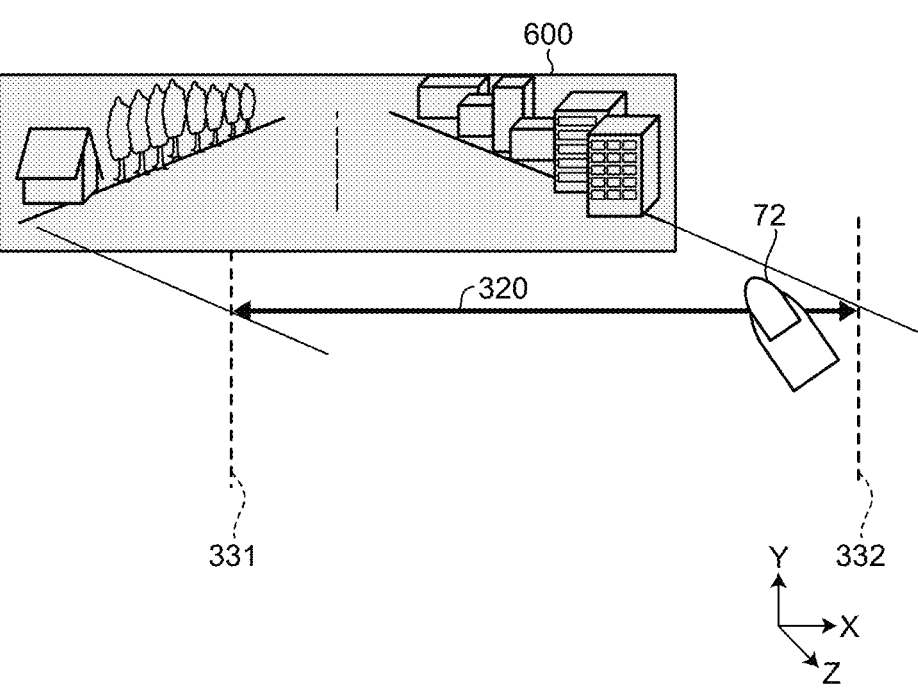
FIG. 10 is a diagram illustrating an example of the virtual operation region according to the second modification.

FIGS. 8 to 10 are diagrams illustrating a virtual operation region. FIGS. 8 to 10 illustrate the operation device 600, the position 320 of the fingertip 72 of the user UR, the minimum operation position 331 included in the virtual operation region, and the maximum operation position 332. In the present modification, the luminance of the display surface of the operation device 600 is minimized when the fingertip 72 is located at the minimum operation position 331, while the luminance of the display surface of the operation device 600 is maximized when the fingertip 72 is located at the maximum operation position 332.

In FIGS. 8 to 10, the fingertip 72 is performing a swipe operation on the X-axis. For example, in FIGS. 8 to 10, the swipe operation corresponds to the luminance adjustment operation. FIG. 8 illustrates a virtual operation region in an initial state. FIG. 9 illustrates the virtual operation region in a state where the fingertip 72 of the user UR is detected and the fingertip 72 has moved from the inside of the virtual operation region to the outside of the virtual operation region. FIG. 10 illustrates the virtual operation region after the change.

In FIG. 8, the fingertip 72 exists in the virtual operation region. In FIG. 9, the fingertip 72 exists outside the virtual operation region. In the case of FIG. 9, user UR cannot perform the luminance adjustment operation regarding the operation device 600 because the fingertip 72 is present outside the virtual operation region. Therefore, in a case where the fingertip 72 has moved from the inside of the virtual operation region to the outside of the virtual operation region, the change unit 16 changes the virtual operation region.

FIG. 10 illustrates a state where the change unit 16 has changed the virtual operation region, specifically, the change unit 16 has changed the maximum operation position 332 included in the virtual operation region. By changing the virtual operation region, the user UR can perform the luminance adjustment operation on the operation device 600.

Third Modification

In the above-described embodiment, the seek operation in the horizontal direction and the like have been described as the unidirectional operation by the fingertip 72. However, the operation direction by the fingertip 72 is not limited to the horizontal direction, and may be the vertical direction (in other words, the up-down direction).

Accordingly, with reference to FIGS. 11, 12, 13, and 14, a third modification will describe, as an operation example in the up-down direction, an operation example of changing the virtual operation region in a view angle adjustment operation in the operation device 600. FIGS. 11 to 14 are diagrams illustrating the operation of changing the virtual operation region. FIGS. 11 to 14 assume an operation performed for the view angle adjustment displayed on the display surface of the operation device 600. The view angle is, for example, a position or a view angle in the up-down direction of the operation device 600.

A minimum operation position 333 is a position corresponding to one end of the virtual operation region in the vertical direction. In the example illustrated in FIG. 11, the minimum operation position 333 is a position corresponding to the lower end of the virtual operation region in the vertical direction. A maximum operation position 334 is a position corresponding to the other end of the virtual operation region in the vertical direction. In the example illustrated in FIG. 11, the maximum operation position 334 is a position corresponding to the upper end of the virtual operation region in the vertical direction. Note that the minimum operation position 333 and the maximum operation position 334 illustrated in FIG. 11 are supposed to be the minimum operation position 333 and the maximum operation position 334 in the virtual operation region in the initial state.

Figure 11:
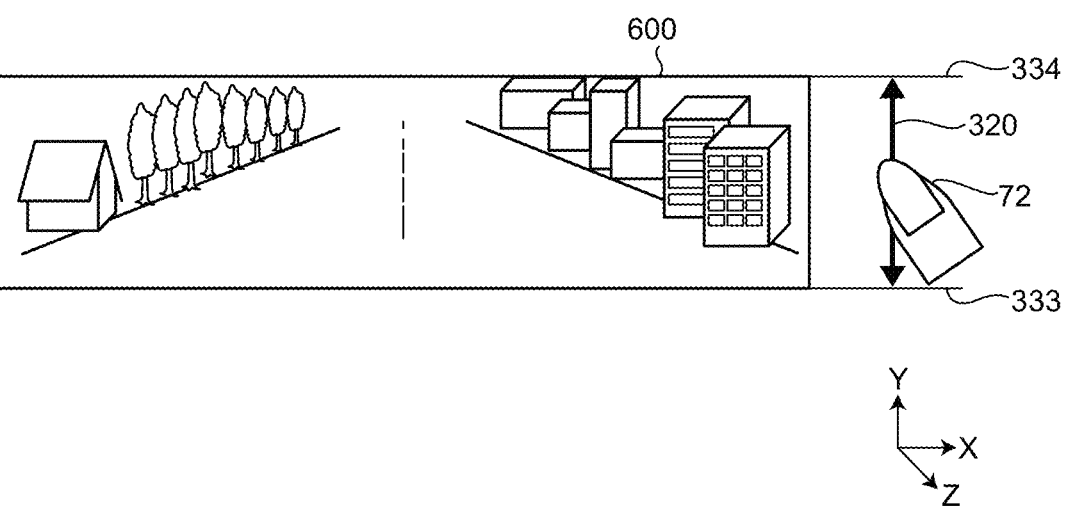
FIG. 11 is a diagram illustrating an example of a virtual operation region according to a third modification.
Figure 12:
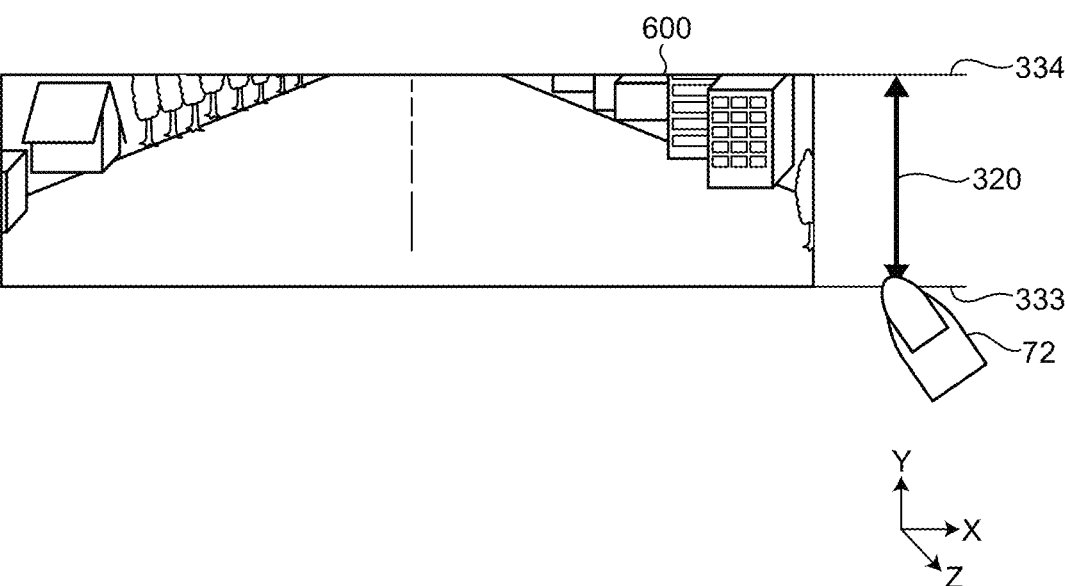
FIG. 12 is a diagram illustrating an example of the virtual operation region according to the third modification.

In FIG. 11, for example, it is assumed that a swipe operation has been performed from the upper side to the lower side by the fingertip 72 in order to lower the view angle displayed on the display surface. When the position 320 of the fingertip 72 of the user UR moves below minimum operation position 333 in the swipe operation (refer to FIG. 12), the determination unit 15 determines that the minimum operation position has been exceeded while the seek operation is continued.

In this case, the change unit 16 changes the setting position of the virtual operation region to follow the motion of the fingertip 72. Specifically, when the fingertip 72 moves to be positioned on the lower side of the minimum operation position 333 in the virtual operation region, the change unit 16 changes the setting position of the virtual operation region by moving the minimum operation position 333 to follow the position of the fingertip 72.

Figure 13:
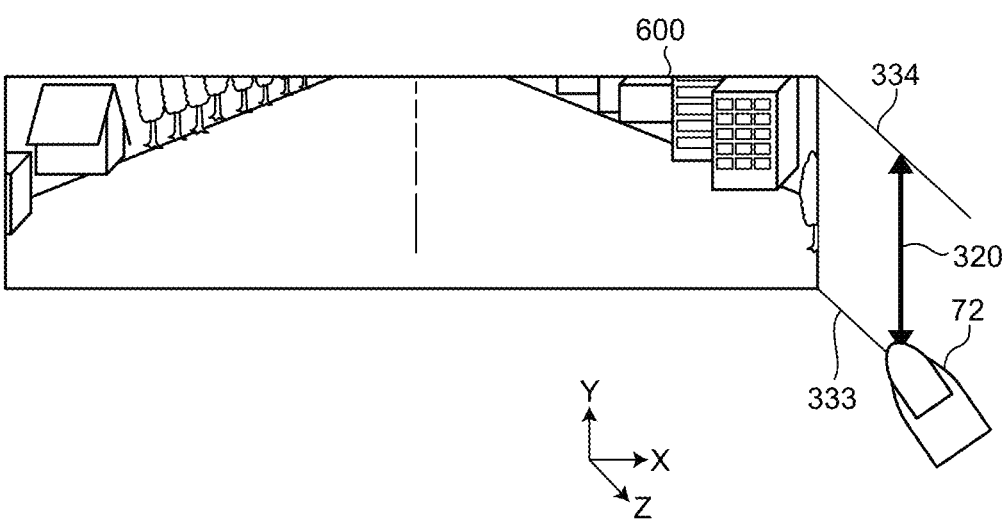
FIG. 13 is a diagram illustrating an example of a virtual operation region according to a third modification.
Figure 14:
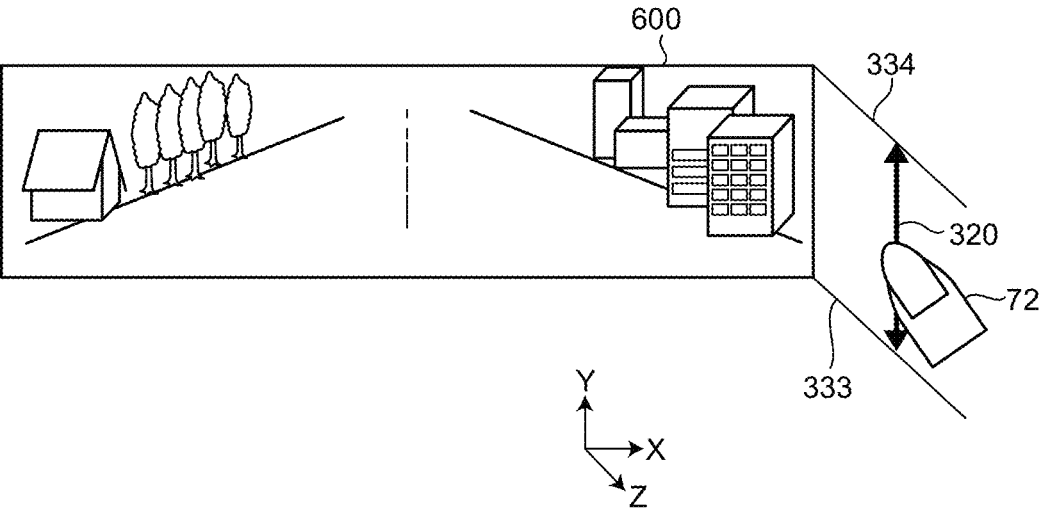
FIG. 14 is a diagram illustrating an example of a virtual operation region according to a third modification.

FIGS. 13 and 14 are diagrams illustrating a state after changing the setting position of the virtual operation region. As illustrated in FIGS. 13 and 14, the change unit 16 changes the setting position of the virtual operation region to follow the fingertip 72 while keeping the size of the virtual operation region. By changing the virtual operation region, the user UR can operate the operation device 600. That is, the user UR can perform a seek operation on the operation device 600.

Comparing the position of the fingertip 72 in FIG. 13 with the position of the fingertip 72 in FIG. 14, the position of the fingertip 72 in FIG. 14 is located in a more positive direction of the Y axis. As a result, the view angle of the operation device 600 in FIG. 14 is higher than the view angle of the operation device 600 in FIG. 13.

Note that, in a case where the fingertip 72 moves to be positioned above maximum operation position 334 in the virtual operation region, the change unit 16 changes the setting position of the virtual operation region by moving the maximum operation position 334 so as to follow the position of the fingertip 72. That is, when a continuous operation in one direction such as a seek operation is performed, the change unit 16 moves the virtual operation region to follow the position of the fingertip 72. By changing the virtual operation region in this manner, the user UR can perform view angle adjustment operation on the operation device 600.

Fourth Modification

Figure 15:
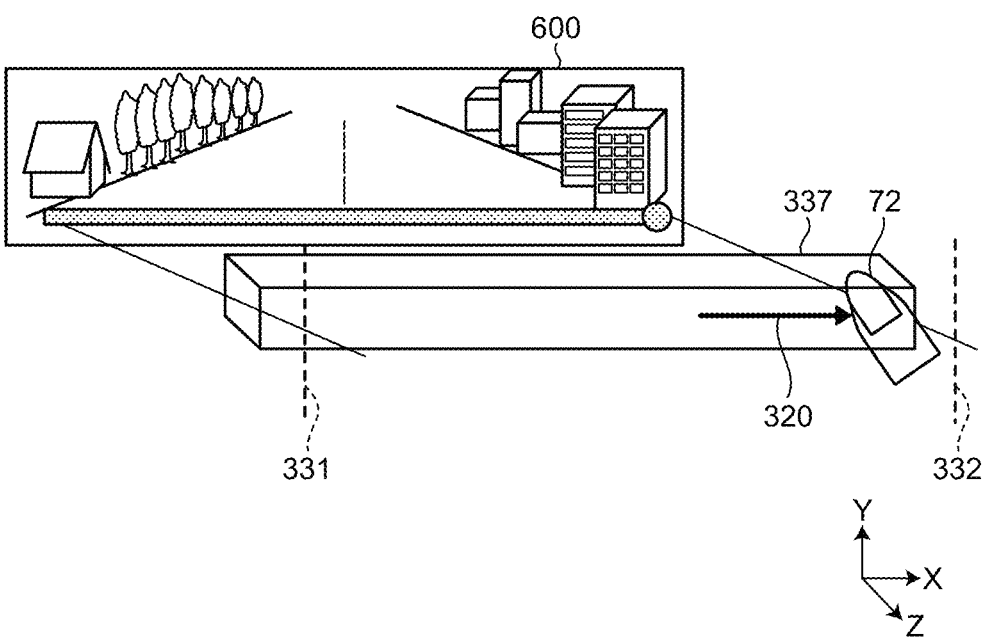
FIG. 15 is a diagram illustrating an example of a virtual operation region according to a fourth modification.
Figure 16:
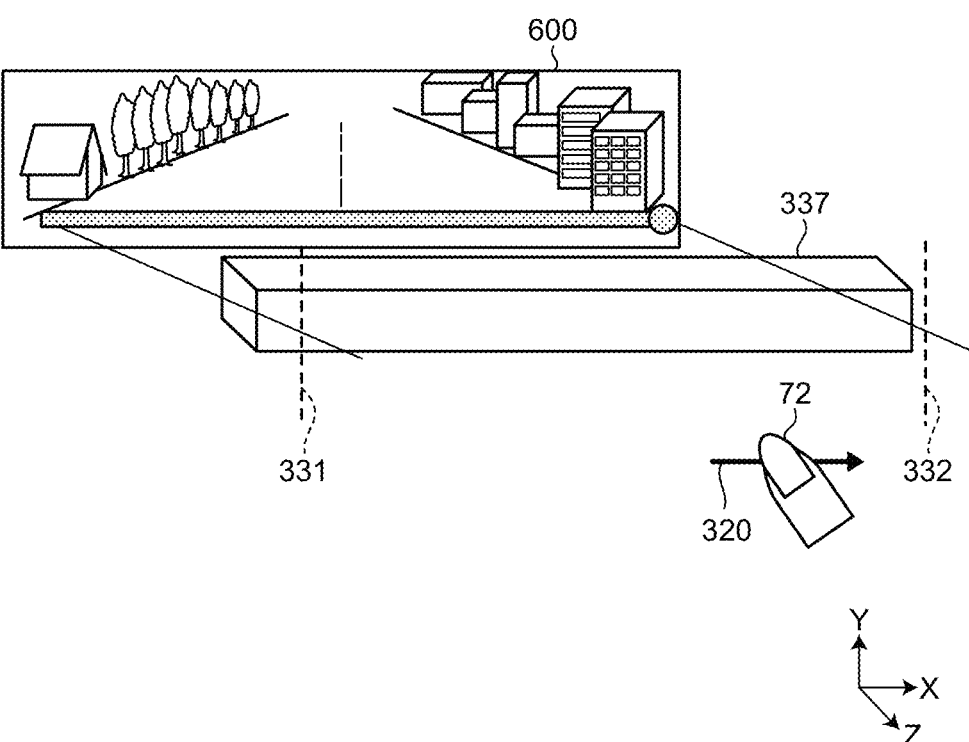
FIG. 16 is a diagram illustrating an example of the virtual operation region according to the fourth modification.

The above-described embodiment is an example in which the virtual operation region is a planar region. However, the virtual operation region is not limited to a planar region (that is, a two-dimensional region), and may be a three-dimensional region having a depth. Accordingly, an operation example in the control apparatus 1 according to a fourth modification in a case where the virtual operation region is a three-dimensional region will be described with reference to FIGS. 15 and 16. FIGS. 15 and 16 are diagrams illustrating a virtual operation region.

FIGS. 15 and 16 illustrate the operation device 600, the position 320 of the fingertip 72 of the user UR, a virtual operation region 337, and the minimum operation position 331 and the maximum operation position 332 on the X axis included in the virtual operation region 337.

The virtual operation region 337 according to the fourth modification is a three-dimensional region expanding in the depth direction (hereinafter, referred to as a three-dimensional region) together with a plane parallel to the display surface of the operation device 600. The virtual operation region 337 is set as a rectangular parallelepiped three-dimensional region, for example. The virtual operation region 337 includes, for example, the minimum operation position 331, the maximum operation position 332, a minimum operation position in the Y axis direction, a maximum operation position in the Y axis direction, a minimum operation position in the Z axis direction, and a maximum operation position in the Z axis direction. Each of the minimum operation position in the Y-axis direction, the maximum operation position in the Y-axis direction, the minimum operation position in the Z-axis direction, and the maximum operation position in the Z-axis direction can be set to any position by the user, for example. FIGS. 15 and 16 illustrate a state where the fingertip 72 is performing a swipe operation on the X-axis.

In FIG. 15, the fingertip 72 exists in the virtual operation region 337. In FIG. 16, it exists outside the virtual operation region 337. In this state, the user UR is considered to be not operating the operation device 600.

Accordingly, the setting unit 14 sets a three-dimensional region formed with a predetermined threshold as the virtual operation region 337, and the determination unit 15 determines whether the three-dimensional coordinates transformed by the coordinate calculation unit 13 exist in the virtual operation region 337. When the determination unit 15 determines that the three-dimensional coordinates exist outside the virtual operation region 337, the change unit 16 does not change the virtual operation region 337.

With this configuration, the control apparatus 1 can suppress a change in the virtual operation region 337 due to an operation unintended by the user UR. The operation unintended by the user UR includes an operation, for example, that the fingertip 72 of the user UR enters the virtual operation region 337 to operate the operation device 600 even with no intention of the user UR to perform the operation.

Fifth Modification

The embodiment described above is a mode in which, when the fingertip 72 has been detected from the virtual operation region, the motion of the fingertip 72 is received as an operation. In this case, when the user unintentionally moves the hand in the virtual operation region, the motion is to be received as an operation onto the operation device 600. To handle this, a fifth modification will describe a technique to handle an unintended operation of the user UR by detecting the operation direction of the fingertip 72.

The control apparatus 1 according to the fifth modification detects the operation direction of the fingertip 72 of the user UR, and changes the virtual operation region on the basis of the detected operation direction of the fingertip 72. The operation direction of the fingertip 72 represents orientation, such as a direction, of the fingertip 72 in the virtual operation region or the detection enabled region. Specifically, the control apparatus 1 detects the operation direction of the fingertip 72 of the user UR. When the operation direction is directed to the operation device 600 and the fingertip 72 has moved from the inside of the virtual operation region to the outside of the virtual operation region, the control apparatus 1 changes the virtual operation region.

Figure 17:
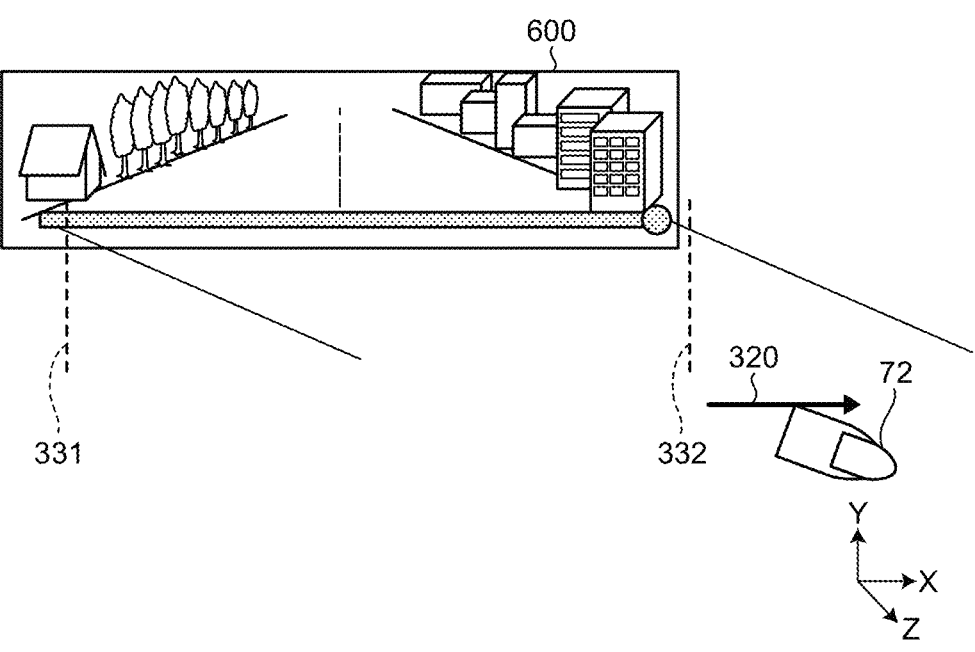
FIG. 17 is a diagram illustrating an example of a virtual operation region according to a fifth modification.

Specific changes to be made onto the virtual operation region by the change unit 16 according to the fifth modification will be described with reference to FIG. 17. FIG. 17 is a diagram illustrating the virtual operation region. FIG. 17 illustrates the operation device 600, the position 320 of the fingertip 72 of the user UR, the minimum operation position 331 included in the virtual operation region, and the maximum operation position 332. In FIG. 17, the fingertip 72 is in a state of performing a seek operation onto the operation device 600.

In FIG. 17, the fingertip 72 exists outside the virtual operation region. The operation direction of the fingertip 72 is not directed to the operation device 600. In FIG. 17, even when the fingertip 72 of the user UR exists in the virtual operation region of the operation device 600, the operation direction of the fingertip 72 is not in a state of facing the operation device 602. In this state, the user UR is considered to be not operating the operation device 600.

Accordingly, the detection unit 12 detects the operation direction of the fingertip 72. When the detected operation direction is directed to the operation device 600 and the fingertip 72 has moved from the inside of the virtual operation region to the outside of the virtual operation region, the change unit 16 changes the virtual operation region. In FIG. 17, the detected operation direction is not directed to the operation device 600. Therefore, even when the fingertip 72 has moved from the inside of the virtual operation region to the outside of the virtual operation region, the change unit 16 does not change the virtual operation region.

This makes it possible for the control apparatus 1 to suppress the change in the virtual operation region due to an unintended operation of the user UR, for example.

Sixth Modification

Figure 18:
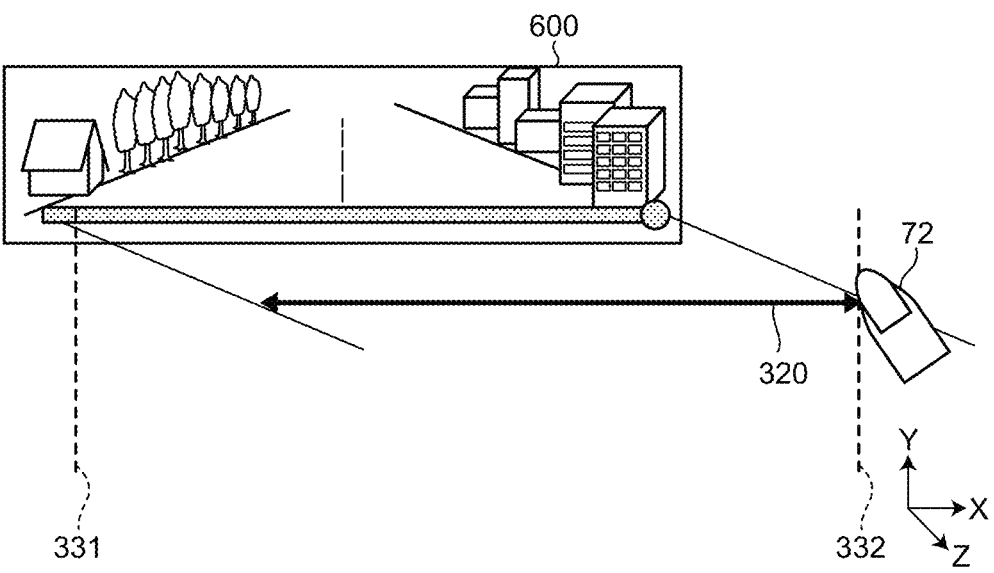
FIG. 18 is a diagram illustrating an example of a virtual operation region according to a sixth modification.
Figure 19:
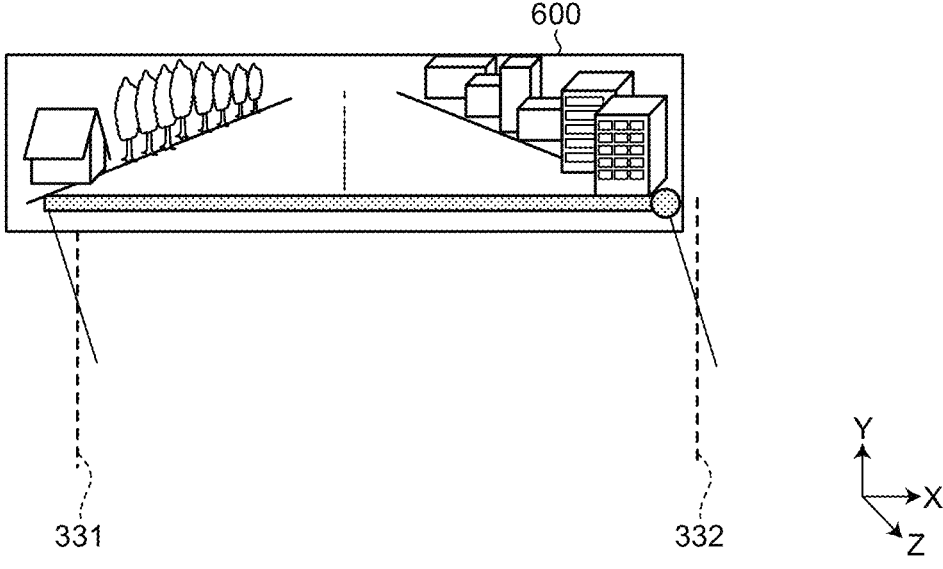
FIG. 19 is a diagram illustrating an example of the virtual operation region according to the sixth modification.

Next, a control apparatus 1 according to a sixth modification will be described. Regarding the control apparatus 1 according to the sixth modification, a mode of restoring the changed virtual operation region to the state before the change will be described with reference to FIGS. 18 and 19. FIGS. 18 and 19 are diagrams illustrating a virtual operation region.

FIGS. 18 and 19 illustrate the operation device 600, and the minimum operation position 331 and the maximum operation position 332 included in the virtual operation region. FIG. 18 also illustrates the position 320 of the fingertip 72 of the user UR. FIG. 18 illustrates a state where the fingertip 72 is performing a swipe operation on the X-axis. FIG. 18 illustrates the virtual operation region after the change. FIG. 19 illustrates a state where the changed virtual operation region has been restored to the virtual operation region before the change.

FIG. 19 illustrates a state where the user UR is performing a release operation on the fingertip 72 from the virtual operation region. The release operation is an operation performed just after ending the operation on the operation device 600. Therefore, the fingertip 72 of the user UR does not exist in the virtual operation region. Therefore, after changing the virtual operation region, the change unit 16 restores the virtual operation region to the virtual operation region before the change on the basis of the release operation corresponding to the motion of the fingertip 72. This makes it possible for the control apparatus 1 to restore the virtual operation region to the initial state.

Seventh Modification

Figure 20:
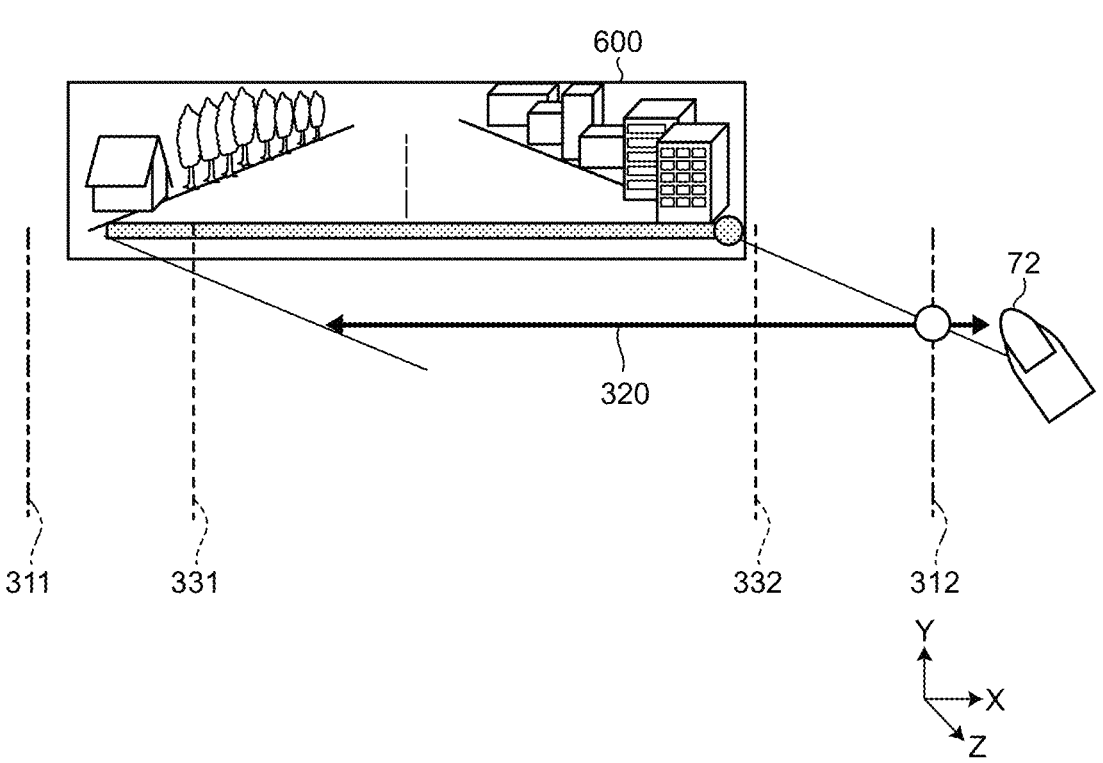
FIG. 20 is a diagram illustrating an example of a virtual operation region according to a seventh modification.

Next, a control apparatus 1 according to a seventh modification will be described. Regarding the control apparatus 1 according to the seventh modification, a mode of changing the virtual operation region when the fingertip 72 of the user UR has moved from the inside of the detection enabled region to the outside of the detection enabled region will be described with reference to FIG. 20. FIG. 20 is a diagram illustrating a virtual operation region.

FIG. 20 illustrates the operation device 600, the minimum detection enabled position 311 and the maximum detection enabled position 312 included in the detection enabled region, and the minimum operation position 331 and the maximum operation position 332 included in the virtual operation region. FIG. 20 also illustrates the position 320 of the fingertip 72 of the user UR.

As illustrated in FIG. 20, for example, in a case where the fingertip 72 of the user UR exceeds the maximum operation position 332 of the virtual operation region from the inside of the virtual operation region and exceeds the maximum detection enabled position 312 from the inside of the detection enabled region in the same direction, the change unit 16 may change the maximum operation position 332 as the maximum detection enabled position 312.

Moreover, in a case where the fingertip 72 of the user UR exceeds the minimum operation position 331 of the virtual operation region from the inside of the virtual operation region and exceeds the minimum detection enabled position 311 from the inside of the detection enabled region in the same direction, the change unit 16 may change the minimum operation position 331 as the minimum detection enabled position 311. This is because even when a region beyond the detection enabled region is set for the virtual operation region, the fingertip 72 cannot be detected.

In other words, the setting unit 14 sets the operation detectable region including the virtual operation region, within the imaging range of the sensor 500. Subsequently, the change unit 16 changes the position of the virtual operation region within the operation detectable region. With this configuration, even when the fingertip 72 of the user UR has moved from the inside of the detection enabled region to the outside of the detection enabled region, the control apparatus 1 can change the virtual operation region.

Moreover, when user UR performs the release operation on the fingertip 72 from the virtual operation region as illustrated in FIG. 20, the change unit 16 may change the virtual operation region, and then restore the virtual operation region to the state before the change on the basis of the release operation corresponding to the motion of the fingertip 72. This makes it possible for the control apparatus 1 to restore the virtual operation region to the initial state.

Eighth Modification

Figure 21:
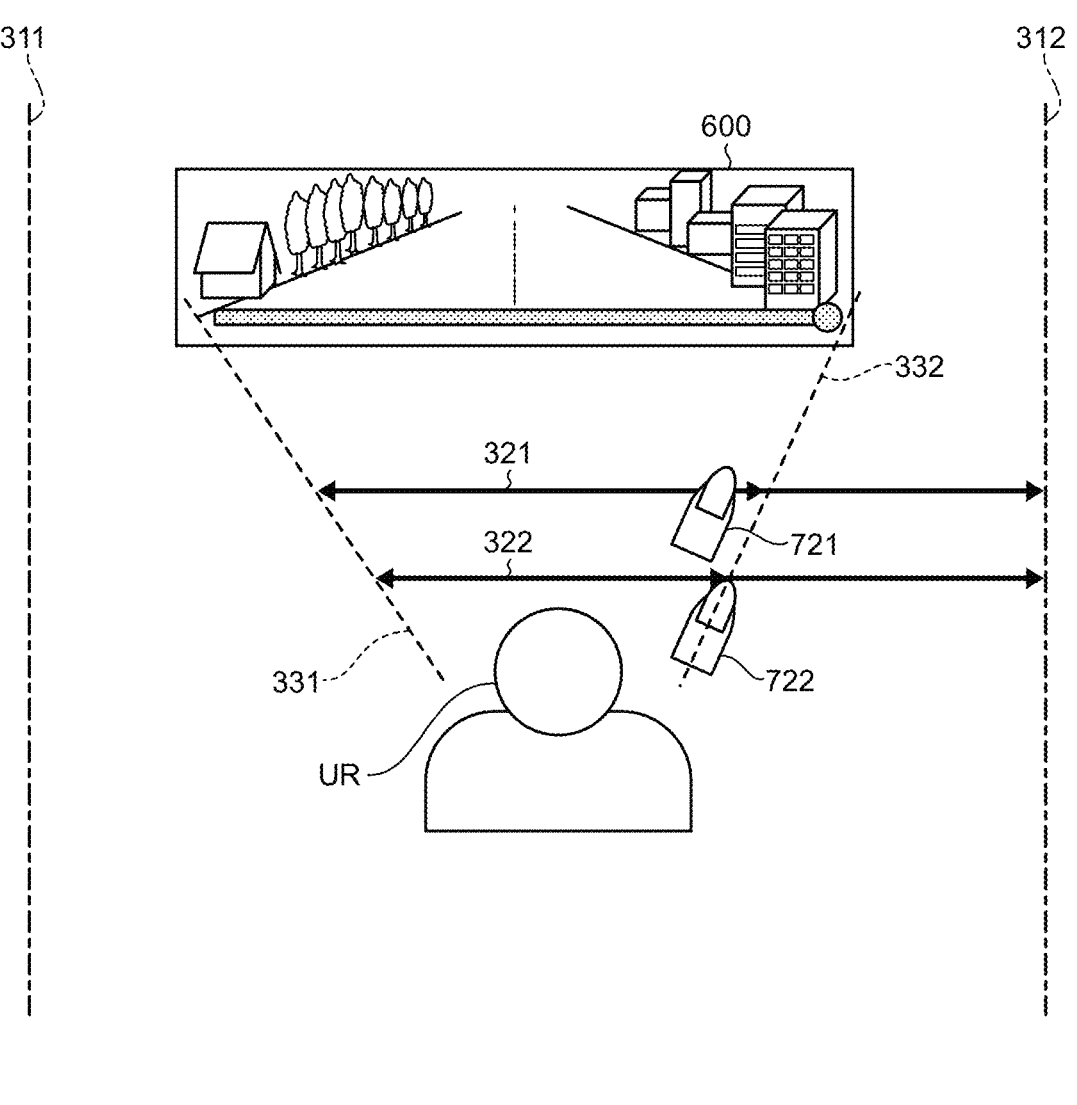
FIG. 21 is a diagram illustrating an example of a virtual operation region according to an eighth modification.

Next, a control apparatus 1 according to an eighth modification will be described. Regarding the control apparatus 1 according to the eighth modification, a mode of setting the virtual operation region on the basis of the positional relationship between the operation device 600 and the user UR will be described with reference to FIG. 21. FIG. 21 is a diagram illustrating a virtual operation region.

FIG. 21 illustrates the operation device 600, a position 321 of a fingertip 721 of the user UR, a position 322 of a fingertip 722 of the user UR, the minimum detection enabled position 311 and the maximum detection enabled position 312 included in the detection enabled region, and the minimum operation position 331 and the maximum operation position 332 included in the virtual operation region. FIG. 21 illustrates a state where the fingertip 72 is performing a swipe operation on the X-axis.

The setting unit 14 sets a virtual operation region on the basis of the positional relationship between the operation device 600 and the user UR, such that, the nearer to the user UR, the smaller the virtual operation region becomes. For example, as illustrated in FIG. 21, the nearer to the user UR, the smaller the virtual operation region becomes. In other words, in the virtual operation region illustrated in FIG. 21, the distance between the minimum operation position 331 and the maximum operation position 332 becomes smaller as it gets closer to the user.

In the case of FIG. 21, the size and magnification of the virtual operation region and the detection enabled region are changed in the Z-axis direction. Moreover, in the case of FIG. 21, the virtual operation region becomes smaller with respect to the detection enabled region as it gets closer to the user UR. Therefore, even with the fingertip 721 and fingertip 722 existing at the same position on the Y axis, the change unit 16 does not change the virtual operation region for the operation of the fingertip 721, but changes the virtual operation region for the operation of the fingertip 722.

This makes it possible for the control apparatus 1 to set the virtual operation region so as to achieve matching between the vision of the user UR and the operation of the fingertip, and facilitate intuitive operations by the user UR.

Ninth Modification

The device operation amount information 35 is not limited to information related to operations on moving images. For example, the device operation amount information 35 may include luminance adjustment and screen position adjustment of an electronic mirror mounted on a vehicle. Moreover, for example, the device operation amount information 35 may include an air conditioner operation, a volume operation, a lighting operation, and the like in a vehicle.

Moreover, for example, the device operation amount information 35 may include adjustment of an imaging angle of a camera mounted outside/inside the vehicle, operation of a 360 degree camera, camera enlargement/reduction adjustment, focus adjustment, aperture value (F value) setting, shutter speed adjustment, ISO sensitivity setting, and the like. Moreover, for example, the device operation amount information 35 may include an up/down/left/right slide operation, an operation related to enlargement/reduction, and the like on a display device displaying a web page or the like.

Tenth Modification

The sensor 500 is not limited to a visible light camera, and may be a charge coupled device (CCD) camera, a complementary metal oxide semiconductor (CMOS) camera, or an RGB camera, for example. Moreover, the sensor 500 is not limited to a camera, and may be a time of flight (TOF) sensor or an infrared sensor.

Eleventh Modification

The detection unit 12 detects the hand and the fingertip of the user on the basis of the image obtained by imaging the user being an operator, but an object of detection not limited thereto. For example, the detection unit 12 may detect a palm or an arm of the user.

In the description of embodiments of the present disclosure, the embodiments have been presented as examples, and are not intended to limit the scope of the invention. These novel embodiments can be implemented in various other forms, with various omissions, substitutions, alterations without departing from the scope and spirit of the invention. These novel embodiments and modifications are included in the scope and spirit of the invention, and are to be included in the invention described in the claims and the equivalent scope thereof. Moreover, constituent elements in different embodiments and modifications may be appropriately combined.

In the above-described embodiment, the notation " . . . unit" used in the above-described embodiment may be replaced with another notation such as " . . . circuitry", " . . . assembly", " . . . device", " . . . part", or " . . . module".

In each of the above embodiments, the present disclosure has been described as an example of a configuration using hardware, but the present disclosure can also be implemented by software in cooperation with hardware.

Each functional block used in the description of each embodiment described above is typically implemented as an LSI circuit that is an integrated circuit. The integrated circuit may control each functional block used in the description of the above embodiment and include an input terminal and an output terminal. These may be integrated into one chip for each functional block, or may be integrated into one chip so as to include some or all of the functional blocks. The integrated circuit, referred to as LSI here, can also be referred to as an IC, a system LSI, a super LSI, or an ultra LSI depending on the degree of integration.

In addition, the circuit integration method is not limited to LSI, and may be implemented using a dedicated circuit or a general-purpose processor and memory. It is also allowable to use a Field Programmable Gate Array (FPGA) that can be programmed after manufacturing of the LSI or a reconfigurable processor in which connections or settings of circuit cells inside the LSI can be reconfigured.

Moreover, integration of functional blocks may be implemented by using a technology, specifically, a circuit integration technology emerging as an advanced version of the current semiconductor technology or other derived technologies to replace the LSI. Applicable technologies include biotechnology.

Moreover, the effects of the embodiments described in the present specification are merely examples and are not limited, and other effects may be provided.

Supplementary Notes

The description of the embodiment described above discloses the technique described below.

Supplementary Note 1

An information processing apparatus comprising:
a memory in which a computer program is stored; and
a hardware processor connected to the memory and
    configured to perform processing by executing the
    computer program, the processing including
    receiving, from a camera, an image obtained by imaging a user being an operator;
    setting, within an imaging range of the camera, a virtual
        operation region for receiving an operation onto a
        device;
    detecting a hand of the user on the basis of the image;

operating the device in accordance with a moving direction of the hand of the user in a case where the hand of the user has been detected from the virtual operation region; and changing a position of the virtual operation region to follow a position of the hand of the user in a case where the position of the hand of the user has moved from an inside of the virtual operation region to an outside of the virtual operation region.

Supplementary Note 2

The information processing apparatus according to the supplementary note 1, wherein the processing includes detecting a swipe operation of moving the hand of the user in one direction, and changing the position of the virtual operation region to follow the position of the hand of the user in a case where the hand of the user has moved from the inside of the virtual operation region to the outside of the virtual operation region due to the swipe operation.

Supplementary Note 3

The information processing apparatus according to the supplementary note 1 or 2, wherein the virtual operation region is defined by a minimum operation position indicating one end in a direction in which the operation is performed and a maximum operation position indicating the other end of the direction, and the processing includes changing the minimum operation position or the maximum operation position, each corresponding to a moving direction of the hand of the user, the changing being performed to follow the position of the hand of the user while keeping a size of the virtual operation region.

Supplementary Note 4

The information processing apparatus according to the supplementary note 2, wherein the processing includes changing the virtual operation region on the basis of the hand detected in a seek operation corresponding to the swipe operation.

Supplementary Note 5

The information processing apparatus according to the supplementary note 4, wherein, when two or more devices are arranged adjacent to each other, the processing includes changing, in the seek operation, the virtual operation region by prioritizing an operation onto a device initially operated by the user out of the two or more devices.

Supplementary Note 6

The information processing apparatus according to the supplementary note 3, wherein the minimum operation position and the maximum operation position are set on the basis of at least one of absolute coordinates and relative coordinates with respect to the device.

Supplementary Note 7

The information processing apparatus according to the supplementary note 3, wherein the virtual operation region is a two-dimensional region or a three-dimensional region.

Supplementary Note 8

The information processing apparatus according to any one of the supplementary notes 1 to 7, wherein the processing includes detecting an operation direction of a fingertip of the user, and changing the virtual operation region in a case where the operation direction is directed to the device and the fingertip has moved from the inside of the virtual operation region to the outside of the virtual operation region.

Supplementary Note 9

The information processing apparatus according to any one of the supplementary notes 1 to 8, wherein the processing includes, after the changing of the virtual operation region, restoring the virtual operation region to a state before the changing on the basis of a release operation corresponding to a motion of the hand.

Supplementary Note 10

The information processing apparatus according to any one of the supplementary notes 1 to 9, wherein the processing includes setting, within an imaging range of the camera, an operation detectable region including the virtual operation region; and changing the position of the virtual operation region within the operation detectable region.

Supplementary Note 11

The information processing apparatus according to any one of the supplementary notes 1 to 10, wherein the processing includes setting the virtual operation region on the basis of a positional relationship between the device and the user, and the nearer to the user, the smaller the virtual operation region becomes.

Supplementary Note 12

An information processing system comprising a camera, an information processing apparatus, and a display unit, wherein the camera images a user being an operator, the information processing apparatus includes a memory in which a computer program is stored and a hardware processor connected to the memory, the processor executes the computer program to perform processing, the processing including:

receiving, from a camera, an image obtained by imaging a user being an operator;

setting, within an imaging range of the camera, a virtual operation region for receiving an operation onto a device;

detecting a hand of the user on the basis of the image;

operating the device in accordance with a moving direction of the hand of the user in a case where the hand of the user has been detected from the virtual operation region; and changing a position of the virtual operation region to follow a position of the hand of the user in a case where the position of the hand of the user has moved from an inside of the virtual operation region to an outside of the virtual operation region.

Supplementary Note 13

An information processing method implemented by a computer, the method comprising:

receiving, from a camera, an image obtained by imaging a user being an operator;

setting, within an imaging range of the camera, a virtual operation region for receiving an operation onto a device;

detecting a hand of the user on the basis of the image;

operating the device in accordance with a moving direction of the hand of the user in a case where the hand of the user has been detected from the virtual operation region; and changing a position of the virtual operation region to follow a position of the hand of the user in a case where the position of the hand of the user has moved from an inside of the virtual operation region to an outside of the virtual operation region.

Supplementary Note 14

A non-transitory computer-readable recording medium on which programmed instructions are recorded, the instructions causing a computer to execute processing, the processing comprising:

receiving, from a camera, an image obtained by imaging a user being an operator;

setting, within an imaging range of the camera, a virtual operation region for receiving an operation onto a device;

detecting a hand of the user on the basis of the image;

operating the device in accordance with a moving direction of the hand of the user in a case where the hand of the user has been detected from the virtual operation region; and changing a position of the virtual operation region to follow a position of the hand of the user in a case where the position of the hand of the user has moved from an inside of the virtual operation region to an outside of the virtual operation region.

What is claimed is:

1. An information processing apparatus comprising:

a memory in which a computer program is stored; and a hardware processor connected to the memory and configured to perform processing by executing the computer program, the processing including receiving, from a camera, an image obtained by imaging a user being an operator;

setting, within an imaging range of the camera, a virtual operation region for receiving an operation onto a device;

detecting a hand of the user on the basis of the image;

operating the device in accordance with a moving direction of the hand of the user in a case where the hand of the user has been detected from the virtual operation region; and changing a position of the virtual operation region to follow a position of the hand of the user in a case where the position of the hand of the user has moved from an inside of the virtual operation region to an outside of the virtual operation region, wherein the processing includes detecting a swipe operation of moving the hand of the user in one direction, and changing the position of the virtual operation region to follow the position of the hand of the user in a case where the hand of the user has moved from the inside of the virtual operation region to the outside of the virtual operation region due to the swipe operation, and wherein the processing includes changing the virtual operation region on the basis of the hand detected in a seek operation corresponding to the swipe operation.

2. The information processing apparatus according to claim 1, wherein the virtual operation region is defined by a minimum operation position indicating one end in a direction in which the operation is performed and a maximum operation position indicating the other end of the direction, and the processing includes changing the minimum operation position or the maximum operation position, each corresponding to a moving direction of the hand of the user, the changing being performed to follow the position of the hand of the user while keeping a size of the virtual operation region.

3. The information processing apparatus according to claim 2, wherein the minimum operation position and the maximum operation position are set on the basis of at least one of absolute coordinates and relative coordinates with respect to the device.

4. The information processing apparatus according to claim 2, wherein the virtual operation region is a two-dimensional region or a three-dimensional region.

5. The information processing apparatus according to claim 1, wherein, when two or more devices are arranged adjacent to each other, the processing includes changing, in the seek operation, the virtual operation region by prioritizing an operation onto a device initially operated by the user out of the two or more devices.

6. The information processing apparatus according to claim 1, wherein the processing includes detecting an operation direction of a fingertip of the user, and changing the virtual operation region in a case where the operation direction is directed to the device and the fingertip has moved from the inside of the virtual operation region to the outside of the virtual operation region.

7. The information processing apparatus according to claim 1, wherein the processing includes, after the changing of the virtual operation region, restoring the virtual operation region to a state before the changing on the basis of a release operation corresponding to a motion of the hand.

8. The information processing apparatus according to claim 1, wherein the processing includes setting, within an imaging range of the camera, an operation detectable region including the virtual operation region; and changing the position of the virtual operation region within the operation detectable region.

9. The information processing apparatus according to claim 1, wherein the processing includes setting the virtual operation region on the basis of a positional relationship between the device and the user, and the nearer to the user, the smaller the virtual operation region becomes.

10. An information processing method implemented by a computer, the method comprising:

receiving, from a camera, an image obtained by imaging a user being an operator;

setting, within an imaging range of the camera, a virtual operation region for receiving an operation onto a device;

detecting a hand of the user on the basis of the image;

operating the device in accordance with a moving direction of the hand of the user in a case where the hand of the user has been detected from the virtual operation region; and changing a position of the virtual operation region to follow a position of the hand of the user in a case where the position of the hand of the user has moved from an inside of the virtual operation region to an outside of the virtual operation region, wherein the virtual operation region is defined by a minimum operation position indicating one end in a direction in which the operation is performed and a maximum operation position indicating the other end of the direction, and the processing includes changing the minimum operation position or the maximum operation position, each corresponding to a moving direction of the hand of the user, the changing being performed to follow the position of the hand of the user while keeping a size of the virtual operation region, and wherein the minimum operation position and the maximum operation position are set on the basis of at least one of absolute coordinates and relative coordinates with respect to the device.

11. A non-transitory computer-readable recording medium on which programmed instructions are recorded, the instructions causing a computer to execute processing, the processing comprising:

receiving, from a camera, an image obtained by imaging a user being an operator;

setting, within an imaging range of the camera, a virtual operation region for receiving an operation onto a device;

detecting a hand of the user on the basis of the image;

operating the device in accordance with a moving direction of the hand of the user in a case where the hand of the user has been detected from the virtual operation region; and changing a position of the virtual operation region to follow a position of the hand of the user in a case where the position of the hand of the user has moved from an inside of the virtual operation region to an outside of the virtual operation region, wherein the processing includes, after the changing of the virtual operation region, restoring the virtual operation region to a state before the changing on the basis of a release operation corresponding to a motion of the hand.

\* \* \* \* \*